(12) United States Patent
Lorah et al.

(10) Patent No.: US 7,291,665 B2
(45) Date of Patent: Nov. 6, 2007

(54) EMULSION POLYMERIZATION METHODS INVOLVING LIGHTLY MODIFIED CLAY AND COMPOSITIONS COMPRISING SAME

(75) Inventors: Dennis Paul Lorah, Lansdale, PA (US); Robert Victor Slone, Quakertown, PA (US)

(73) Assignee: Rohm and Raas Company, Philadelphia, PA (US)

( * ) Notice: Subject to any disclaimer, the term of this patent is extended or adjusted under 35 U.S.C. 154(b) by 451 days.

(21) Appl. No.: 10/853,309

(22) Filed: May 25, 2004

(65) Prior Publication Data

US 2004/0220317 A1 Nov. 4, 2004

Related U.S. Application Data

(62) Division of application No. 09/953,830, filed on Sep. 17, 2001, now Pat. No. 6,759,463.

(51) Int. Cl.
C08K 3/34 (2006.01)
(52) U.S. Cl. ................ 524/445; 524/186; 524/446; 524/447
(58) Field of Classification Search ............ 524/446, 524/447, 445
See application file for complete search history.

(56) References Cited

U.S. PATENT DOCUMENTS

| | | | |
|---|---|---|---|
| 2,531,396 A | 11/1950 | Carter et al. | 260/41.5 |
| 2,883,356 A | 4/1959 | Gluesenkamp | 260/37 |
| 4,739,007 A | 4/1988 | Okada et al. | 524/789 |
| 4,867,902 A | 9/1989 | Russell | 252/186.23 |
| 4,889,885 A | 12/1989 | Usuki et al. | 524/445 |
| 5,032,546 A | 7/1991 | Giannelis et al. | 501/3 |
| 5,279,663 A | 1/1994 | Kaliski | 106/464 |
| 5,552,469 A * | 9/1996 | Beall et al. | 524/445 |
| 5,780,376 A | 7/1998 | Gonzales et al. | 501/146 |
| 5,837,763 A | 11/1998 | Ferraro et al. | 524/449 |
| 5,883,173 A | 3/1999 | Elspass et al. | 524/446 |
| 5,936,023 A | 8/1999 | Kato et al. | 524/445 |
| 5,962,553 A | 10/1999 | Ellsworth | 523/216 |
| 5,973,053 A | 10/1999 | Usuki et al. | 524/445 |
| 5,998,528 A | 12/1999 | Tsipursky et al. | 524/445 |
| 6,034,164 A | 3/2000 | Elspass et al. | 524/445 |
| 6,057,035 A | 5/2000 | Singh et al. | 428/403 |
| 6,252,020 B1 * | 6/2001 | Kuo et al. | 526/128 |
| 6,838,507 B2 * | 1/2005 | Chou et al. | 524/445 |
| 7,186,474 B2 * | 3/2007 | Jang | 429/17 |
| 2005/0059769 A1 * | 3/2005 | Chou et al. | 524/445 |

FOREIGN PATENT DOCUMENTS

| | | |
|---|---|---|
| GB | 2314335 | 12/1997 |
| JP | 94041346 | 2/1994 |
| WO | WO 95/14733 | 6/1995 |
| WO | WO 97/00910 | 1/1997 |
| WO | WO 00/29467 | 5/2000 |

OTHER PUBLICATIONS

Noh, et al., "Synthesis and Characterization of PS-clay Nanocomposite by Emulsion Polymerization", Polymer Bulletin, 42, (1999), pp. 619-626.
Choi, et al., "Characterization of Emulsion Intercalated Polymer-Na Montmorillonite Nanocomposite", Department of Polymer Science and Engineering, Inha University, Inchon, South Korea, pp. 247-248.
Noh, et al., "Comparison of Characteristics of SAN-MMT Nanocomposites Prepared by Emulsion and Solution of Polymerization", Department of Polymer Science and Engineering, Inha University, Inchon, South Korea, pp. 2811-2819.
Noh, et al. "Intercalation of Styrene-Acrylonitrile Copolymer in Layered Silicate by Emulsion Polymerization", Department of Polymer Science and Engineering, Inha University, Inchon, South Korea, pp. 179-188.
Lee, et al., "Characterization of Epoxy-Clay Hybrid Composite Prepared by Emulsion Polymerization", Journal of Applied Polymer Science, vol. 68, 1998, pp. 1997-2005.
Lee, et al., "Preparation and Characterization of PMMA-Clay Hybrid Composite by Emulsion Polymerization", Journal of Applied Polymer Science, vol. 61, 1996, pp. 1117-1122.
Bhattacharyya, et al., Aqueous Polymerization on Clay Surfaces v. Role of Lattice Substituted Iron in Montmorillonite in Polymerization Methyl Methacrylate in the Presence of Thiourea, Journal of Polymer Science, vol. 28, pp. 2249-2254.
Bera, et al., "Water-Soluble Copolymers of Acrylamide with Diacetone-Acrylamide and N-t-Butylacrylamide on Aqueos Montmorillonite Surface, Synthesis and Characterization, European Polymer Journal, vol. 36, 2000, pp. 411-419."
Bera, et al., "Redox Polymerisation of Acrylamide on Aqueous Montmorillonite Surface: Kinetics and Mechanism of Enhanced Chain Growth", University of North Bengal, Darjeeling 734430, India, 1997.
Kirk-Othmer, "Surfactants", Concise Encyclopedia of Chemical Technology, 4th Ed., 1999, pp. 1949-1953.
Martin Grayson, Encyclopedia of Composite Materials and Components, 1983, pp. 324-340.
Kingery, et al., "Structure of Crystals", Introduction to Ceramics, 2nd Ed., 1960, pp. 77-80.
"Clay Mineralogy", www.pitt.edu/~harbert/courses/GEO0040/2C_CLAYS.html.

(Continued)

Primary Examiner—Katarzyna Wyrozebski
(74) Attorney, Agent, or Firm—Andrew E. C. Merriam

(57) ABSTRACT

Processes for utilizing various emulsion polymerization procedures for preparing aqueous nanocomposite dispersions are disclosed. The disclosed processes include both in-situ polymerizations in the presence of at least partially exfoliated, lightly modified clays as well as admixtures of polymer dispersions with at least partially exfoliated, lightly modified clay dispersions. The disclosed nanocomposite dispersions are useful for preparing a variety of materials, such as coatings, adhesives, caulks, sealants, plastics additives, and thermoplastic resins. Processes for preparing polymer nanocomposite powders and use of these powders as plastic resin and plastics additives are also disclosed.

19 Claims, No Drawings

OTHER PUBLICATIONS

Lecture Notes for Clay Mineralogy, www.gly.uga.edu/schroeder/geo16550/CM20.html.

"Soil Colloids: Their Nature and Practical Signifigance", www.agri.atu.edu/people/Hodgson/Soils/Chapter8.html.

Beall, et al., "Nanocomposites Produced Utilizing A Novel Ion-Dipole Clay Surface Modification", Chemistry and Technology of Polymer Additives, pp. 266-280.

Beall, et al., Nanocomposites Produced Utilizing a Novel Clay Surface Modification, pp. 1-14.

Ron Dagani, "Putting the "Nano" into Composites", C&EN Washington, Jun. 7, 1999, pp. 25-37.

"Ion-Exchange Reaction", Encyclopedia Britannica, www.britannica.com/bcom/eb/article/printable/2/0,5722,118752.00.html.

Kim, et al., "Electrorheological Characteristics of Emulsion Polymerized San-Clay Nanocomposite Suspensions", Department of Polymer Science and Engineering, Inha University, Inchon, South Korea, pp. 512-513.

Ugolstad, et al., "Swelling of Aqueos Dispersions of Polymer-Oligomer Particles. Preparation of Polymer Particles of Predetermined Particle Size Including Large Monodisperse Particles", pp. 83-93.

Xavier Kornmann, "Synthesis and Characterisation of Thermoset-Clay Nanocomposites", Lulea University of Technology, S-971 87, Lulea, Sweden, pp. 1-29.

Huang, et al., Synthesis and Characterization of PMMA Nanocomposites by Suspension and Emulsion Polymerization, Department of Polymer Science, University of Akron, 2000, pp. A-D.

* cited by examiner

EMULSION POLYMERIZATION METHODS INVOLVING LIGHTLY MODIFIED CLAY AND COMPOSITIONS COMPRISING SAME

This application is a divisional of prior U.S. application Ser. No. 09/953,830, filed Sep. 17, 2001, now U.S. Pat. No. 6,759,463.

The present invention relates generally to polymer clay aqueous nanocomposite dispersions and methods for making and using the same. More particularly, the present invention relates to methods of making polymer clay nanocomposites using lightly hydrophobically modified clays in aqueous systems. This invention also relates to the use of these nanocomposite compositions as, for example, thermoplastic resins, capstock, coatings, sealants, caulks, adhesives, and as plastics additives.

One way of improving polymer properties is by adding a clay material to polymers to form composite materials. However, incorporating clays into polymers may not provide a desirable improvement in the physical properties, particularly mechanical properties, of the polymer. This may be due, for example, to the lack of affinity between the clay and the polymer at the interface, or the boundary, between the clay and polymer within the material. In this connection, affinity between the clay and the polymer may improve the physical properties of the resulting nanocomposite by allowing the clay material to uniformly disperse throughout the polymer. The relatively large surface area of the clay, if uniformly dispersed, may provide more interfaces between the clay and polymer, and may subsequently improve the physical properties, by reducing the mobility of the polymer chains at these interfaces. By contrast, a lack of affinity between the clay and polymer may adversely affect the strength of the composition by having pockets of clay concentrated, rather than uniformly dispersed, throughout the polymer. Affinity between clays and the polymers is related to the fact that clays, by nature, are generally hydrophilic whereas polymers, such as the polymers used in the aforementioned applications, are generally hydrophobic.

Clay minerals are typically comprised of hydrated aluminum silicates that are fine-grained and have a platy habit. The crystalline structure of a typical clay mineral is a multi-layered structure comprised of combinations of layers of $SiO_4$ tetrahedra that are joined to layers of $AlO(OH)_2$ octahedra. The term Agallery@, as used herein, describes the interlayer spaces of the layered clay minerals. The terms "d-spacing" or "basal spacing", as used herein, define the sum of the single layer thickness and the thickness of the interlayer or gallery, which is the repeat unit of the multilayer mineral. Depending upon the clay mineral, the gallery may contain water and/or other constituents such as potassium, sodium, or calcium cations. Clay minerals vary based upon the combination of their constituent layers and cations. Isomorphic substitution of the cations of clay mineral, such as $Al^{3+}$ or $Fe^{3+}$ substituting for the $Si^{4+}$ ions in the tetrahedral network, or $Al^{3+}$, $Mg^{2+}$ or $Fe^{2+}$ substituting for other cations in the octahedral network, typically occurs and may impart a net negative charge on the clay structure. Naturally occurring elements within the gallery of the clay, such as water molecules or sodium or potassium cations, are attracted to the surface of the clay layers due to this net negative charge.

Nanocomposites are compositions in which at least one of its constituents has one or more dimensions, such as length, width or thickness, in the nanometer size range. The term Ananocomposite@, as used herein, denotes the state of matter wherein polymer molecules exist among at least partially exfoliated clay layers. Recently, nanocomposites that contain layered clay materials such as montmorillonite having silicate layers of a thickness of 1 nanometer dispersed within a polymeric matrix, have been developed as a means to improve the physical properties of polymers. In order to effectively improve the physical or mechanical properties, the clay is typically uniformly dispersed throughout the polymer in order to promote more interfaces between the clay and polymer and enhance the affinity of the clay to the polymer at these interfaces. Further, if the clay is uniformly dispersed throughout the polymer, less clay material may be added to the nanocomposite composition while maintaining the physical properties of the nanocomposite.

Polymer-clay nanocomposites can be characterized as being one of several general types: intercalated nanocomposite, exfoliated nanocomposite, or combinations thereof. The term "intercalated nanocomposite", as used herein, describes a nanocomposite that consists of a regular insertion of the polymer in between the clay layers. The term "exfoliated nanocomposite", as used herein, describes a nanocomposite wherein the 1 nm-thick layers of clay are dispersed in the matrix forming a composite structure on the microscale. The latter type of composite, or exfoliated nanocomposite, maximizes the polymer-clay interactions thereby making the entire surface of the clay layers available for the polymer. This modification may lead to the most dramatic changes in mechanical and physical properties of the resultant polymer. By contrast, the term "conventional composite", as used herein, describes a composite where the clay acts as a conventional filler and is not dispersed on a nano-scale. These composites generally do not enjoy the improvement in mechanical and physical properties seen with exfoliated nanocomposites. In certain embodiments of the present invention, some portion of the clay in the polymer clay nanocomposites may exist as structures larger than exfoliated or intercalated composites.

In order to promote more affinity between the clay and the polymer at the interface and provide a uniform dispersion of the clay within the polymer, the interlayer surface chemistry of the clay may be modified to render the silicate layers less hydrophilic. Previous methods of altering the interlayer surface chemistry of the clay include the use of modifying agents, such as surfactants or silanes, to prepare a clay dispersion prior to its incorporation into a polymer. For example, surfactants may typically comprise a molecule having a hydrophilic functions (which has an affinity to polar media such as water or clay) and an organophilic function (which has an affinity to organic molecules such as oil or polymer). The use of surfactants allows one to disperse clay within a polymer. As used herein, the term "hydrophobically modified clays" denotes clays that may have its surface chemistry modified through the use of an agent such as a surfactant, silane, or other modifier.

Typical agents used to render a clay less hydrophilic may include, but are not limited to, amino acids, alkylammonium ions, silanes, aminomethylstyrene, or living free radical polymerization initiator ("LFRP"). Further non-limiting examples of other suitable agents for the synthesis of nanocomposites are provided in the reference, M. Ogawa et al., "Preparation of inorganic-organic nanocomposites through intercalation of organoammonium ions into layered silicates", Bull. Chem. Soc. Jpn., 70, 2593-2619 (1997).

Amino acid surfactants are molecules that may consist of a basic amino group ($-NH_2$) and an acidic carboxyl group ($-COOH$). When introduced into an acidic medium, a proton may be transferred from the $-COOH$ group to the intramolecular $-NH_2$ group. It is believed that a cation exchange occurs between the —$NH_3^+$ functional group that is formed and the naturally occurring cations (i.e., $Na^+$, $K^+$, etc.) present between the clay layers. This results in an intercalated state wherein the —$NH_3^+$ functional groups are Asandwiched@ between the individual layers replacing the naturally occurring cation. The term Aintercalate@, as used herein, refers to incorporating foreign molecules, atoms, or ions in between the layers of the clay material. As a result of this intercalated state, the clay becomes organophilic. Amino acid surfactants are commonly used in the preparation of polyamide 6-clay hybrids because their acid functional group may polymerize with ε-caprolactam that is intercalated between the layers. As a result, the intragallery polymerization delaminates the clay in the polymer matrix thereby forming a nanocomposite.

Alkylammonium ion surfactants, such as onium salts, are commonly used to prepare clay dispersions for nanocomposite materials. The basic formula for a typical alkylammonium ion is $CH_3$—$(CH_2)_n$—$NH_3^+$ where n is between 1 and 18. It is believed that the alkylammonium ions also readily exchange with the naturally occurring cations present between the clay platelets resulting in an intercalated state. Further, it is believed that the alkylammonium ions may increase the d-spacing between the clay layers and also may lower the surface energy of the clay thereby allowing organic species with different polarities to become intercalated between the clay layers.

Silanes may also be used in the synthesis of unsaturated polyester-clay nanocomposites. Silanes are a family of organosilicon monomers, which may be characterized by the formula R—$SiX_3$, where R is an organofunctional group, attached to silicon in a hydrolytically stable manner and X designates hydrolyzable groups that may be converted to silanol groups upon hydrolysis. It is believed that silanes interact with inorganic surfaces such as clay that have hydroxyl groups attached primarily to silicon or aluminum thereby forming a bond with the inorganic surface.

Hydrophobically modified clays have been oftentimes used in the preparation of nanocomposite materials. The article, "Synthesis and Characterization of Thermoset-Clay Nanocomposites" by Xavier Kornmann (referred to herein as the "Kornmann") provides some examples for synthesizing nanocomposites using hydrophobically modified clays using in-situ polymerization, melt intercalation, or solution-based polymerization methods. In the in-situ polymerization method, the hydrophobically modified clay, referred to in the article as "organoclay", is swollen in a monomer and then the polymerization reaction is initiated, through the addition of a curing agent or by an increase in temperature, to form the nanocomposite. It is believed that the polymerization reaction leads to the delamination of the clay. In the melt intercalation method, a molten thermoplastic is blended with a hydrophobically modified clay and then annealed at a temperature above the glass transition temperature of the polymer to form the nanocomposite. Lastly, in the polymer melt intercalation method, the hydrophobically modified clay is first swollen in a solvent such as toluene or N,N-dimethylformamide. The polymer is then dissolved into the solvent where it intercalates between the clay layers. The solvent is then removed from the resulting nanocomposite via evaporation.

None of the methods disclosed in Kormann uses hydrophobically modified clays within aqueous systems. However, Kormann discusses preparing nanocomposites using solution polymerization involving untreated clays, or unmodified clays, in which the polar solvent is deionized water.

There are significant processing difficulties encountered when preparing nanocomposites in aqueous dispersions using hydrophobically modified clays. In this connection, U.S. Pat. No. 5,883,173 issued to Elspass et al. (hereafter AElspass@) describes a process for preparing single stage rubbery nanocomposite materials by polymerizing or blending latex polymers in the presence of a dispersion of a layered (clay) material. In the aqueous latex processes provided, Elspass discloses that the layered material is dispersed in water with a surfactant such as an onium salt for separating the layers, and then the monomers are polymerized for approximately 46 hours to allow the polymers to intercalate between the layers.

The step of adding a surfactant to exfoliate the layers is time-consuming (e.g., Elspass discloses mixing a clay, surfactant, and monomer slurry for 20 hours, prior to polymerizing for another 26 hours). Moreover, the exfoliated clay dispersions tend to be highly viscous thereby causing processing problems. The processes of the present invention are much faster and lower in viscosity than those disclosed by Elspass.

The reference, Huang et al. "Synthesis and Characterization of PMMA Nanocomposites by Suspension and Emulsion Polymerization", Amer. Chem. S. (2000) ("Huang") describes the use of hydrophobically modified clays to form a nanocomposite via suspension polymerization or emulsion polymerization. During the suspension polymerization, the hydrophobically modified clays are used as "suspension stabilizers" whereas during the emulsion polymerization, the surfactant was used as the emulsifier and the unmodified clay was added after polymerization. The Tg of the resultant nanocomposites are too high to be useful for many of the applications disclosed herein. Further, the nanocomposites are formed by a "melt press" process rather than in an aqueous system. In this process, the nanocomposite is formed after heating the polymer above its Tg.

Another disadvantage of using hydrophobically modified clays is that some agents, particularly cationic surfactants, used to modify the clay may destabilize polymer latex emulsions. Many of the surfactants, such as onium salts, that are used to disperse clays are also emulsifying agents. In some cases, extreme difficulties may be encountered in the preparation of a stable polymer latex in the presence of such onium salt modified clays. To keep such emulsions stable in the presence of such onium salts, a large quantity of emulsifier may be required. Larger quantities of emulsifier can degrade properties of the polymer in its final use (e.g., poorer water resistance). Furthermore, large quantities of emulsifier may deleteriously affect the formation of polymer latex particles. Modifying agents typically used for solution based nanocomposite synthesis, e.g. dimethyl di(hydrogenated tallow) ammonium, are too hydrophobic for aqueous systems and may cause loss of particle size control or latex coagulation. Non-uniform polymer latex particle formation may lead to variations in emulsion droplet size resulting in non-uniform polymer particle sizes. Large quantities of emulsifier may also lead to the formation of "secondary particles" which may further broaden the particle size distribution. As well, there are often problems associated with broad particle size distributions such as shear instability of the emulsion, variability in polymer molecular weight (leading to variations in polymer process and properties), and degradation of properties when dried to a powder (e.g., dust resulting from the presence of small polymer particles).

The foregoing problems aggravate the formation of latex polymer particles using emulsion polymerization processes. More particularly, the foregoing problems aggravate the formation of multi-stage latex polymer particles. Examples of multi-stage polymer processes, which are susceptible to these problems, include the preparation of "core-shell" polymer particles and using the gradual monomer addition, or "grad-add" processes.

It is thus surprising and unexpected to prepare polymer clay nanocomposites incorporating lightly hydrophobically modified clays, or lightly modified clays, in aqueous based systems such as emulsion polymerization. The term "lightly modified clays", as used herein, describes clays that have been modified, via a modifying agent or other means, to become slightly hydrophobic but not destabilize the polymer latex emulsion. The methods of the present invention provide polymer clay nanocomposites that exhibit control of particle size, stability, and high polymerization rates. The methods of the present invention allow for control of reaction conditions such as temperature that is advantageous for industrial or commercial production. The methods of the present invention also allow for control of the viscosity of the resultant aqueous nanocomposite dispersions and thereby avoid processing problems associated with high viscosity. Further, the present invention provides methods for the formation of soft, film forming polymer clay nanocomposites that exhibit an increase in strength without the expected increase in Tg.

Nanocomposites produced in accordance with the methods of the present invention may preferably be provided in a form suitable for direct use in a variety of compositions, such as, for example, coatings, sealants, thermosets, textiles, textile binders, caulks, adhesives, and as plastics additives. The polymer clay nanocomposites of the present invention show significant property improvements at clay levels of 0.1 to 25%, such as increased tensile strength with little or no adverse effect on ancillary properties such as barrier properties, flexibility and the like. By contrast, conventional composites typically need 15-30% of a filler in order to see significant reinforcement. At this level of filler, ancillary properties like barrier properties, flexibility and the like are degraded.

The present invention is directed, in part, to nanocomposite compositions in aqueous systems and processes for preparing same. Specifically, in one embodiment of the present invention, there is provided a process for preparing an aqueous nanocomposite dispersion wherein a first and second aqueous reaction mixture is provided, combined, and then at least a portion of said ethylenically unsaturated monomers in the first and second aqueous reaction mixtures is polymerized. The first aqueous reaction mixture comprises at least one ethylenically unsaturated monomer and optionally at least one surfactant, and the second aqueous reaction mixture comprises an at least partially exfoliated aqueous clay dispersion having at least one lightly modified clay, at least one ethylenically unsaturated monomer, and optionally a surfactant. In certain embodiments, the monomer is polymerized after the combining step. It is understood, however, that these steps may be performed in a variety of different orders. For example, in one embodiment, the second providing step and the combining step may be performed either prior to or after the polymerizing step.

In another embodiment of the present invention, there is provided a core-shell polymer clay nanocomposite composition comprising from 10 to 90 parts of a first stage core polymer and from 90 to 10 parts of a second stage nanocomposite shell. The second stage nanocomposite shell comprises from 0.1 to 25 parts of an at least partially exfoliated, lightly modified clay and from 80 to 99.9 parts of a polymer polymerized from an ethylenically unsaturated monomer.

In yet another embodiment of the present invention, there is provided a process for preparing an aqueous nanocomposite dispersion which includes the steps of providing an aqueous dispersion comprising a plurality of polymer seeds, adding an aqueous emulsion to the dispersion, and polymerizing the monomer to form the polymer clay nanocomposite dispersion. The polymer seeds have a mean particle diameter ranging from 20 to 500 nanometers and are present in the dispersion in an amount ranging from 0.1 to 10% based on dry weight of total dry polymer weight in the nanocomposite dispersion. The aqueous emulsion comprises 0.1 to 25% based on dry weight of total dry polymer weight in the nanocomposite dispersion of at least one lightly modified clay and at least one ethylenically unsaturated monomer.

In still another embodiment of the present invention, there are provided coatings, adhesives, caulks, sealants, plastics additives, thermosets, textiles, textile binders, inks, graphic arts, and thermoplastic resins prepared according to the processes of the present invention.

In yet a further embodiment of the present invention, there is provided a process for preparing an aqueous nanocomposite dispersion comprising admixing an aqueous emulsion polymer 0.1 to 25 weight % based upon dry weight of the emulsion polymer of at least one lightly modified clay.

In still a further embodiment of the present invention, there is provided a method for preparing a plurality of hollow, polymer clay nanocomposite particles, wherein the method comprises providing an aqueous emulsion of a multi-stage emulsion polymer. The multi-stage emulsion polymer comprises: a core stage polymer comprising an aqueous polymer clay nanocomposite composition comprised of polymerized units of at least one ethylenically unsaturated monomer, an at least one unmodified clay, and at least one modifying agent wherein the clay is lightly modified prior to the formation of the shell stage polymer and a shell stage polymer comprising polymerized units of at least one ethylenically unsaturated monomer and at least one lightly modified clay. The core stage polymer is swollen with at least one swelling agent and optionally at least one ethylenically unsaturated monomer such that at least a portion of the core stage polymer contacts at least a portion of the shell stage polymer. The monomer is then polymerized to form the polymer clay nanocomposite particles which becomes hollow upon drying.

These and other aspects of the invention will become apparent from the following detailed description.

The present invention is directed to processes for preparing nanocomposite compositions, particles, colloids, and dispersions using lightly modified clays for emulsion polymerization systems. It has now been found that various emulsion polymerization procedures, such as multi-stage and grad-add polymerizations, are useful for preparing nanocomposite polymeric materials wherein a modifying agent, such as a surfactant, may present processing difficulties. The present invention overcomes these processing difficulties, such as particle size, viscosity, or other attributes, that are typically encountered using hydrophobically modified clays of the prior art. The present invention also provides uses for these aqueous based nanocomposite compositions, such as, for example, coatings, sealants, thermosets, textiles, textile binders, caulks, adhesives, and as plastics additives.

In certain embodiments of the present invention, the nanocomposite is prepared via an emulsion-based polymerization technique. For example, in connection with the preparation of an aqueous nanocomposite dispersion, two separate aqueous reaction mixtures may be prepared initially which is followed by a multi-stage emulsion polymerization of the monomer within one or both of the reaction mixtures. While the present application discusses multi-stage polymerization primarily in terms of two stages, it is understood that more than two stages of polymerization of the monomer are further envisioned. The term Astage@, Amulti-stage@, and "core shell" as used herein, is intended to encompass its broadest possible meaning, such as, for example, the meaning conveyed in U.S. Pat. Nos. 3,793,402, 3,971,835, 5,534,594, and 5,599,854, which disclose various means for achieving Astaged@ and Amulti-staged@ polymers. The first aqueous reaction mixture typically comprises a monomer mixture whereas the second aqueous reaction mixture comprises an aqueous clay dispersion and, optionally, a monomer mixture. In certain embodiments, however, the first aqueous reaction mixture may also comprise an aqueous clay dispersion. The term "aqueous nanocomposite dispersion" relates to a clay and polymer nanocomposite that further comprises an aqueous, or water phase. In certain embodiments, the monomer mixture in the first and/or the second aqueous reaction mixtures may be emulsified. In one embodiment of the present invention, the percent weight of lightly modified clay to the total amount of monomer within the aqueous nanocomposite dispersion can be in the range of from 0.05% to 25%, preferably from 0.1% to 15%, and more preferably from 0.1% to 10%, and even more preferably from 0.5% to 5%.

The aqueous nanocomposite dispersion contains polymerized units derived from at least one type of ethylenically unsaturated monomer. The term Aunits derived from@, as used herein, refers to polymer molecules that are synthesized according to known polymerization techniques wherein a polymer contains Aunits derived from@ its constituent monomers. Preferably, the ethylenically unsaturated monomer is selected such that the polymerized units within the aqueous nanocomposite dispersion are water insoluble, i.e., have low or no water solubility. By Awater-insoluble@ it is meant having a water solubility of no greater than 150 millimoles/liter at 25 EC to 50 EC.

The preparation of the monomer mixture typically involves the vigorous mixing of at least one ethylenically unsaturated monomer with water and an emulsifier. In other embodiments of the present invention the monomer may be added Aneat@, i.e., added without water. The amounts of monomer, water, and emulsifier in the monomer mixture may vary depending upon, for example, the particular monomer and/or emulsifier selected, the intended end-use, and the like. If the monomer amount is too low then reaction kinetics will be slow, whereas if the monomer amount is too high then the emulsified monomer mixture may be unstable. In certain embodiments, the amount of monomer in the monomer mixture is preferably in the range of from 25 to 100, preferably from 40 to 90, and even more preferably from 60 to 80 weight percent. The amount of water in the monomer mixture, if aqueous based, is preferably in the range of from 0.1 to 75, more preferably from 10 to 60, and even more preferably from 20 to 40 weight percent based on the total weight of the emulsified monomer mixture (e.g., monomers, emulsifier, and water). The amount of emulsifier in the monomer mixture, if added, is preferably in the range of from 0.01 to 10, preferably from 0.05 to 2, and even more preferably from 0.1 to 1 weight percent. If the emulsifier amount is too low then the monomer emulsion droplet size may be too large or cause an unstable emulsion. If the emulsifier amount is too high then excess emulsifier may interfere with the polymerization process.

The monomers which may be polymerized include any of the ethylenically unsaturated monomers commonly known in the art, such as those listed in The Polymer Handbook, $3^{rd}$ Edition, Brandrup and Immergut, Eds., Wiley Interscience, Chapter 2, (1989). Suitable ethylenically unsaturated monomers include, for example, the $C_1$-$C_{18}$ alkyl(meth)acrylate monomers (e.g., methyl-, ethyl-, propyl-, n-butyl-, sec-butyl-, tert-butyl, pentyl-, isobornyl-, hexyl-, heptyl-, n-octyl-, 2-ethylhexyl-, decyl-, undecyl-, dodecyl-, lauryl, cetyl, and stearyl-(meth)acrylate and the like); vinyl aromatic monomers (e.g., styrene, alpha-methyl styrene, para-methyl styrene, chlorostyrene, vinyl toluene, dibromostyrene, tribromostyrene, vinyl naphthalene, isopropenyl naphthalene, divinylbenzene and the like); vinyl esters (e.g., vinyl acetate; vinyl versitate; and the like); vinyl-unsaturated carboxylic acids monomers (e.g., methacrylic acid, acrylic acid, maleic acid, itaconic acid); nitrogen-containing vinyl unsaturated monomers (e.g., acrylonitrile, methacrylonitrile, and $C_1$-$C_{18}$ alkyl (meth)acrylamides, and the like); dienes (e.g., butadiene and isoprene); ethylene, hydroxyethyl(meth)acrylate, hydroxypropyl(meth)acrylate, and the like. The term A(meth)acrylate@, as used herein, refers to both esters of methacrylate and acrylate.

For the purposes of preparing nanocomposite compositions having desirable resistance to weathering, it is preferred to use monomers selected from the class of alkyl (meth)acrylates. For the purposes of providing low cost and commercially available aqueous nanocomposite dispersions, it is preferable that the ethylenically unsaturated monomer be selected from the group consisting of $C_1$-$C_{18}$ alkyl methacrylate, $C_1$-$C_{18}$ alkyl acrylate, acrylic acid, methacrylic acid, butadiene, vinylaromatic monomers, and the like. For the purposes of using the aqueous nanocomposite dispersions for preparing coatings and adhesives, it is preferable to use $C_1$-$C_{18}$ alkyl (meth)acrylate monomers; acrylic acid; methacrylic acid; itaconic acid; vinyl acetate; vinyl versatate; vinyl aromatic monomers, and the like. It may be even more preferable to use n-butyl acrylate, ethyl acrylate, butyl methacrylate, methyl methacrylate, styrene, butadiene, acrylic acid, and methacrylic acid monomers for the purpose of providing aqueous nanocomposite dispersions in a variety of applications due to their relatively low cost and commercial availability.

Where it is desirable to covalently cross-link the polymers and/or to graft link multiple stage polymers (e.g., for preparing core-shell two-stage polymer particles), crosslinkers and/or graftlinkers may also be included in the monomer mixtures. The term Acrosslinker@, as used herein, refers to multi-functional monomers capable of forming two or more covalent bonds between polymer molecules of the same type. The term Agraftlinker@, as used herein, refers to multi-functional monomers capable of forming two or more covalent bonds between polymer molecules of one type with polymer molecules of another type. Suitable crosslinkers or graftlinkers include, for example, divinyl benzene, butylene glycol di(meth)acrylate, alkanepolyol-polyacrylates or alkanepolyol-polymethacrylates such as ethylene glycol di(meth)acrylate, oligoethylene glycol diacrylate, oligoethylene glycol dimeth-acrylate, trimethylol-propane diacrylate, trimethylolpropane dimeth-acrylate, trimethylol-propane triacrylate (ATMPTA@) or trimethylolpropane trimethacrylate, and unsaturated carboxylic acid allyl esters such as allyl acrylate, diallyl maleate, and typically allyl methacrylate, and the like.

In certain preferred embodiments, at least one of the monomers within the monomer-containing mixture is a polar monomer. The term Apolar monomer@, as used herein, describes a monomer with a partially or completely negative charge. Examples of these monomers include, but are not limited to, monomers containing carboxylic acid, phosphate, or sulfate functional groups. Still further examples of polar monomers are monomers that include hydroxyl, ester, ether, amide, aldehyde and ketone functional groups. Preferably, the polar monomer is a carboxylic acid containing monomer. The term "acid containing monomer", as used herein, refers to any ethylenically unsaturated monomer that contains one or more acid functional groups or functional groups that are capable of forming an acid, such as an anhydride, for example, methacrylic anhydride, maleic anhydride, or itaconic anhydride. Examples of acid containing monomers include, for example, carboxylic acid bearing ethylenically unsaturated monomers such as acrylic acid, methacrylic acid, itaconic acid, maleic acid and fumaric acid; acryloxypropionic acid and (meth)acryloxypropionic acid; sulphonic acid-bearing monomers, such as styrene sulfonic acid, sodium vinyl sulfonate, sulfoethyl acrylate, sulfoethyl methacrylate, ethylmethacrylate-2-sulphonic acid, or 2-acrylamido-2-methylpropane sulphonic acid; phosphoethylmethacrylate; the corresponding salts of the acid containing monomer; or combinations thereof. In other embodiments of the present invention, the polar monomer comprises polar oligomers or unsaturated oligomers, such as trimers, that have a partially or completely negative charge and which have one or more points of unsaturation, such as terminal unsaturation. In certain other embodiments of the present invention, the polar monomer comprises low molecular weight polymeric stabilizers that may be soluble in base (i.e., contain many $CO_2H$ groups and are alkali soluble). Some non-limiting examples of these polar, polymeric stabilizers include MOREZ® 101 or TAMOL® 731, both of which are manufactured by Rohm and Haas, Inc. of Philadelphia, Pa. In these embodiments, the amount of polar stabilizer within the system may range from 15 to 50 weight percent.

In certain embodiments, the aqueous clay dispersion, or second reaction mixture, may comprise a monomer mixture of at least one ethylenically unsaturated monomer which is a polar monomer. Preferably, the polar monomer is an acid containing monomer. In these embodiments, a portion of the polar monomer is Astaged@, i.e., a portion of the polar monomer, 50% or less, preferably 25% or less, even more preferably 10% or less, is added to the first aqueous reaction mixture containing no clay and the remainder of the polar monomer is added to the second aqueous reaction mixture. In embodiments involving acid containing monomers, it is believed that this allows the acid functional groups to equilibrate within the clay galleries and remain there during the polymerization process. The acid containing monomer may aid in lowering the viscosity of the aqueous reaction mixture containing clay and enhance the affinity of the polymer to the clay surface. This staged method of anionic monomer addition may advantageously result in an improvement in physical properties in comparison to a straight addition of the anionic monomer to the first aqueous reaction mixture.

In embodiments where the acid containing monomer is staged, the amount of acid staged in the second aqueous reaction mixture containing clay can range from greater than 0% to less than 100% of the total acid charged within the aqueous nanocomposite dispersion. The second aqueous reaction mixture may contain from 1% to 50%, preferably 5% to 25%, and even more preferably 5% to 15% of the acid containing monomer within the aqueous nanocomposite dispersion. For those embodiments which utilize higher levels of acid (i.e., 10% or greater of the total monomer within the aqueous nanocomposite dispersion is an acid containing monomer) or for those embodiments that use anionic surfactants for stabilization of the polymer dispersion, a lower percentage of acid containing monomer is incorporated into the second aqueous reaction mixture. The optimal amount of acid containing monomer will vary by the composition of the reaction mixture and the acid type. Accordingly, the optimal amount for enhancing the affinity between the polymer and the clay would include one clay acid group, one divalent ion, and one acid containing monomer. The optimal amount will employ only as much acid containing monomer as necessary in the second aqueous reaction mixture to modify the clay with polymer; the remaining amount of acid containing monomer within the first aqueous reaction mixture will then aid in stabilizing the growing polymer/clay nanocomposite particles.

In embodiments where nonionic polymer stabilizers are used, such as for example, alkyl ethoxylated surfactants, the relative amount of acid containing monomer within the second aqueous reaction mixture in comparison to the first aqueous reaction mixture will tend to be a higher percentage of the total amount of acid containing monomer in the nanocomposite. In these embodiments, the acid containing monomer is intended to specifically aid in the intercalation and exfoliation of the clay and not for stabilization of the polymer particle.

In certain embodiments, the reaction mixture may include a polymer latex or polymer latex particle. In these embodiments, the polymer latex may be prepared, or polymerized, from any of the aforementioned monomers. Preferably, the polymer latex or polymer latex particles are polymerized in an aqueous medium in the absence of the clay particles. In one embodiment, the polymer latex is prepared via emulsion polymerization employing a monomer mixture including at least one polymerizable acid containing monomer, wherein the acid containing monomer may be selected from the group consisting of itaconic acid and dihydrogen phosphate esters of an alcohol, the alcohol containing a polymerizable olefinic group, phosphoric acid, or methacrylic acid. Additional monomers used in the polymer latex or polymer latex particles of the present invention are provided in, for example, WO 93/12184 Vogel et. al.

Suitable emulsifiers may include, but are not limited to, those conventionally used in emulsion polymerization, such as salts of alkyl-, aryl-, aralkyl-, alkaryl-sulfates or sulfonates; alkyl-, aryl-, aralkyl-, alkaryl-poly(alkoxyalkyl) ethers; alkyl-, aryl-, aralkyl-, alkaryl-poly(alkoxyalkyl)sulfates; alkali salts of long-chain fatty acids such as potassium oleate, typically alkyl diphenyloxide disulfonate; and the like. The preferred emulsifiers may include, for example, dodecyl benzene sulfonate and dioctyl sulfosuccinate.

The second aqueous reaction mixture comprises an aqueous clay dispersion. The aqueous clay dispersions include at least 0.05, typically from 0.1 to 25, more typically from 0.1 to 15, even more typically from 0.1 to 10, and most typically from 0.5 to 5 weight percent of a lightly modified clay based upon the weight of the dry polymer in the aqueous nanocomposite dispersion. The amount of water present in the aqueous clay dispersion is from 70 to almost 100 weight percent. In certain embodiments, the aqueous clay dispersion may also include a monomer mixture comprising at least one ethylenically unsaturated monomer, such as the monomers disclosed herein. In embodiments wherein a monomer mixture is added to the aqueous clay dispersion, the weight percentage of the monomer within the aqueous clay dispersion may be from 0.01% to 100% by weight.

Suitable clays for the aqueous clay dispersion include any natural or synthetic layered mineral capable of being intercalated or exfoliated. Examples of such clays may include, for example, layered silicate minerals. The layered silicate minerals that may be employed include natural and synthetic minerals capable of forming intercalation compounds. Examples of some naturally occurring minerals include, but are not limited to those known as, smectite, phyllosilicate, montmorillonite, saponite, beidellite, montronite, hectorite, stevensite, vermiculite, kaolinite and hallosite. Preferably among these minerals is montmorillonite. Some non-limiting examples of synthetic minerals, or synthetic phyllosilicates, may include LAPONITE®, which is manufactured by Laporte Industries, Ltd. of Charlotte, N.C., magadiite, and fluorohectorite.

Clays typically have at least one naturally occurring cation, or first cation, such as potassium, calcium, or sodium, present within their galleries that are attracted to the net negative charge of the clay surface. For example, clays like montmorillonite may be mined with a naturally occurring cation such as sodium or calcium. The terms Asodium form@ or Acalcium form@ refer to clays that have an exchangeable cation which is primarily sodium or calcium, respectively.

The cationic exchange capacity (ACEC@) of the clay relates to the ion exchange capacity of the clay, or the total quantity of positive charge that can be absorbed onto the clay surface, expressed in terms of positive charges per unit mass of colloidal particles. Some CEC values for exemplary clay materials are as follows: montmorillonite clays range from 70 to 150 meq/100 g; hallosite clays range from 40 to 50 meq/100 g; and kaolinite clays ranges from 1 to 10 meq/100 g. In certain embodiments of the present invention, the clays selected preferably have higher CEC values. In preferred form, clays used in the present invention may have a CEC capacity of about 40 meq/100 g or greater, preferably a CEC capacity of about 70 meq/100 g or greater, more preferably a CEC capacity of about 90 meq/100 g or greater, and even more preferably a CEC capacity of 100 meq/100 g or greater. In certain embodiments of the present invention, the CEC capacity of the clay may be increased, which enhances the affinity of the clay to the polymer within the nanocomposite dispersion, by electrochemically reducing the clay prior to the polymerization of at least a portion of the monomer.

Aqueous clay dispersions may be prepared by subjecting an aqueous clay mixture comprising at least one unmodified clay to shearing forces such as by mechanical mixing to partially and/or fully exfoliate the clay. Various high shearing methods to disrupt the physical integrity of clay particles in water to at least partially exfoliate the clay without requiring a modifying agent such as a surfactant are also envisioned. These methods include, but are not limited to, ultrasonication, megasonication, grinding/milling, high speed blending, homogenization, and the like. The aqueous clay dispersion may also be subjected to shearing forces at temperatures which range from 10 to 150° C., preferably from 20 to 100° C., and more preferably from 20 to 90° C. to further aid in exfoliating the clay layers. Although such high shearing methods may be used in the process of the present invention, these methods are not required to achieve an at least partially exfoliated state. In the various embodiments of this invention, the clay may include both exfoliated clay layers and non-exfoliated clay particles. In certain embodiments of the present invention, homogenization of the clay dispersion is not required.

In the present invention, the clays within the aqueous clay dispersion may be either partially or completely exfoliated. Preferably, the clay is an at least partially exfoliated clay. The term Aat least partially exfoliated clay@, as used herein, generally refers to clay in which the layers have been completely or partially separated from one another. By contrast, the term Anon-exfoliated clay@ generally refers to the physical state of clay which does not exist as separated layers. The term "intercalated" generally refers to the state where polymers are interposed between the layers of the clay within the system. The term "partially intercalated" generally refers to the state wherein some of the clay layers within the system have polymer in between the layers and other clay layers do not. Any of the various states of polymer and clay systems may be used in the present invention.

Typically, the aqueous dispersions of completely ("fully") exfoliated clay are quite viscous and/or gelatinous at clay concentrations greater than a few percent. It should be appreciated to those skilled in the art that the exact weight percent (concentration) of clay which forms such a highly viscous gel depends on a number of factors, including but not limited to clay type, temperature, pH, and the like. Typically, the clay dispersion forms a free-flowing liquid slurry rather than a viscous gel.

In the present invention, limiting the degree of exfoliation to less than 100% complete, i.e. partial exfoliation (less than 100%) typically provides clay dispersions that have reduced viscosities and/or a non-gelled liquid state. Hence, the portion of the clay that is exfoliated into clay layers typically provides the major contribution to viscosity increase while the non-exfoliated portion (i.e., clay particles) provides a minor contribution to the viscosity increase. Accordingly, the total amount of partially exfoliated clay in a aqueous clay dispersion is typically less than a few percent by weight, preferably 5% or less, more preferably 4% or less, and even more preferably 3% or less, based on the total weight of the dispersion. Further exfoliation of the clay may take place during subsequent processing, such as in the step of emulsion polymerization. It is contemplated that the reduction of viscosity of the aqueous clay dispersion may be aided by dispersants, such as, but not limited to polyphosphates. These may be added during the polymerization process or to the polymerized products.

Often, moderate mechanical mixing not requiring high shear may be suitable to provide dispersions of an at least partially exfoliated clay in water. When fully exfoliated clays cause processing problems associated with the presence of high viscosities and/or gels in the reaction media, the degree of exfoliation should be less than complete. Likewise, to achieve the desired chemical and physical properties, the clay should be at least partially exfoliated. As well, the step of shearing clays in an aqueous environment typically results in a viscosity increase of the aqueous environment. Usually, the greater the degree of exfoliation the greater the increase in viscosity.

Besides increasing the degree of exfoliation of the clay, increasing the clay concentration within the aqueous nanocomposite dispersion may also result in increased viscosities. To this end, viscosity may be controlled by dilution of the reaction media and/or clay dispersion by a suitable liquid, such as water. Typically, it may be desirable to control the viscosity of reaction media and/or clay dispersion by dilution prior to the polymerization step(s). For example, to obtain a high level of clay enrichment in the nanocomposites of the present invention (e.g., clay amounts greater than 5% based on total weight polymer within the aqueous nanocomposite dispersion), the reaction media may be diluted with a sufficient amount of water prior to subsequent polymerization steps to reduce the viscosity. The amount of dilution that is necessary to achieve a particular viscosity level may be readily determined by those skilled in the art. Typically, to obtain a sufficient viscosity range prior to adding subsequent reactants, the solids concentration of the reaction media may be controlled to less than 40%, and more typically less than 30%. In some embodiments, the viscosity of the aqueous dispersion prior to adding the reactants may range up to 5,000 centipoises (Acps@) using a Brookfield Viscometer and measured using a number 3 spindle at 60 revolutions per minute (Arpm@).

Lightly hydrophobically modified clays, or lightly modified clays, may be used with the methods of the present invention. Clays may be lightly modified either prior to or during the polymerization step. As mentioned earlier, agents such as surfactants modify the surface chemistry of the clays, for example, by ion exchanging with the naturally occurring cations present within the clay. This results in an Aintercalated@ state wherein the surfactant is Asandwiched@ between the individual layers replacing the naturally occurring cation. Some exemplary agents may include, but are not limited to, surfactants (e.g., amino acids, oleic acids, fatty acids, alkylammonium ions), silanes, aminomethylstyrene, or living free radical polymerization initiator ("LFRP").

Clays may be lightly modified by using, for example, small chain, $C_1$ to $C_8$ modifying agents. Alternatively, clays may be lightly modified by using a lower amount of more hydrophobic, less water soluble modifying agents sufficient to alter the hydrophilic nature of the clay but insufficient to destabilize the polymer latex emulsion. Traditional modifying agents may be used in minor amounts to lightly hydrophobicially modify the clay but not destabilize the polymer latex. In this connection, the amount of modifying agent that may be added to the reaction mixture ranges from 0.1 to 200%, preferably from 0.1 to 100%, and more preferably from 10 to 100% percent based on the CEC of the clay.

Typical surfactants have a hydrophilic head group and at least one oleophilic tail wherein the tails are selected from hydrogen and alkyl, alkenyl, and alkynyl groups having 4 to 30 carbon atoms. These surfactants may be used alone or in combination with each other such as in a mixture depending upon the compatibility of the other surfactants in the mixture or the other ingredients within the aqueous system. A listing of exemplary surfactants suitable for use in the present invention are provided in *McCutcheon's Detergents and Emulsifiers* (MC Publishing Co., Glen Rock, N.J.), published annually.

Typical surfactants may include nonionic, anionic, cationic, and amphoteric (zwitterionic) surfactants. Nonionic surfactants are surfactants having no charge when dissolved or dispersed in aqueous solutions. Typical nonionic surfactants include, for example, ($C_6$-$C_{18}$)alkylphenol alkoxylates (such as t-octyl phenol and nonylphenol ethoxylates having 1-70, and preferably 5-16, ethyleneoxide units), ($C_{12}$-$C_{20}$) alkanol alkoxylates and block copolymers of ethylene oxide and propylene oxide, and ($C_4$-$C_{18}$) alkyl glucosides as well as the alkoxylated products obtainable therefrom by alkoxylation, particularly those obtainable by reaction of alkyl glucosides with ethylene oxide. Anionic surfactants are surfactants having a hydrophilic functional group in a negatively charged state in an aqueous solution. Typical anionic surfactants include, for example, ($C_8$-$C_{18}$) alkyl carboxylic acids, ($C_{12}$-$C_{20}$) sulfonic acids (sulfonated alkylaryl compounds such as sodium dodecylbenzenesulfonate), ($C_{10}$-$C_{20}$) sulfuric acid esters (sulfated alcohols such as lauryl and cetyl sulfates, sodium salts), phosphate esters and salts thereof. Cationic surfactants contain hydrophilic functional groups where the charge of the functional groups is positive when dissolved or dispersed in an aqueous solution. Typical cationic surfactants include, for example, ($C_{12}$-$C_{20}$) amine compounds (such as lauryl pyridinium chloride, octylbenzyltrimethylammonium chloride and dodecyltrimethylammonium chloride) and oxygen containing amines. Further cationic surfactants may include onium salts such as, for example, salts comprising quaternary ammonium, quaternary phosphonium, or tertiary sulfonium cations or aliphatic mono-, di-, and polyamines derived from fatty and rosin acids. In the representative surfactants provided, the positive charge generally resides on an amino or quaternary nitrogen. Amphoteric or zwitterionic surfactants, such as for example cocamidopropyl betaine, contain both acidic and basic hydrophilic groups and may also be used in the present invention.

Some non-limiting examples of surfactants that may be used with certain embodiments of the present invention are found in U.S. Pat. Nos. 4,473,675 and 2,531,427. U.S. Pat. No. 4,473,675 discloses the use of quaternary ammonium compounds such as an admixture of a dimethyl di(hydrogenated tallow) ammonium compound and from 10% to 90% by weight of a dimethyl benzyl(hydrogenated tallow) ammonium compound to modify a clay. U.S. Pat. No. 2,531,427 discloses the use of onium compounds that are defined by the type RXHy, which are isologs of ammonium and contain the element X wherein X may be pentavalent as in ammonium, phosphonium, arsonium, and stibonium; tetravalent such as in oxonium, sulfonium, selenium, and stannonium compounds; trivalent such as in iodonium compounds and may be considered addition compounds of oxonium, carbonium, or stibonium. Further compounds provided in U.S. Pat. No. 2,531,427 include salts of aliphatic, cyclic, aromatic, and heterocyclic amines, primary, secondary, and tertiary amines and polyamines, and quaternary ammonium compounds such as monovalent or polyvalent onium compounds such as triphenylalkyl phosphonium-asonium-stibonium-halides, or dialkyl-, or aryl-sulphonium and selenonium halides and pyrones, such as 2,5-dialkyl gamma pyrone hydrochloride.

Clays may be also lightly modified by employing a polymerizable surfactant as a modifying agent. A polymerizable surfactant, as used herein, is a surfactant that is capable of co-polymerizing with the ethylenically unsaturated monomers within the reaction mixture. Exemplary polymerizable surfactants include, but are not limited to, the ethylenically unsaturated amine salts of alkylbenzene sulfonic acids, alkyl olefin sulfonic acids, alkyl alcohol sulfuric acid esters, alkoxylated alkyl alcohol sulfuric acid esters, fatty acids, and fatty phosphate acid esters, or mixtures thereof, described in W/O 98/32773, 00/05950, 00/06611 and 00/06612.

In some embodiments of the present invention, a clay may be lightly hydrophobically modified, or lightly modified, by an acid ion exchange process. The term "acid ion exchange process", as used herein, comprises adding an ion exchange resin to the clay to render the clay more acidic by exchanging hydrogen ions for cations on the surface of the clay. The term "acid clay", as used herein, refers to a clay that is treated with an ion exchange resin. Ion exchange resins are generally polymeric compounds that contain positively or negatively charged chemical reactive groups that can attract an ion of opposite charge from a surrounding solution. The electrically charged groups may include, for example, sulfonic or carboxylic acid salts or quaternary ammonium salts. Polymers containing acid groups are generally classified as "acid", or "cation exchangers", because they exchange positively charged ions, such as hydrogen ions and metal ions; polymers containing ammonium groups are generally classified as "basic", or "anion exchangers", because they exchange negatively charged ions, usually hydroxide ions or halide ions. Some non-limiting examples of ion exchange resins include styrene-divinylbenzene copolymers, methacrylic acid-divinylbenzene polymers, and phenol-formaldehyde polymers. Further examples of ion exchange resins are provided in Robert Kunin, *Ion Exchange Resins*, 2nd ed. (1958, reprinted 1990). Preferably, a cation exchange resin such as AMBERLITE® IRN-77, which is manufactured by Rohm and Haas Co. of Philadelphia, Pa., may be used in certain embodiments of the present invention. The amount of ion exchange resin, which is preferably added to the aqueous clay dispersion in large excess depending upon batch size, is preferably from 50,000% to 100%, more preferably from 10,000% to 1,000%, and even most preferably from 8,000% to 4,000% by weight, based upon the dry weight of the clay in the aqueous dispersion.

In certain embodiments of the present invention, an acid clay may be prepared prior to the formation of a polymer clay nanocomposite. In this connection, an acid clay may be prepared by providing an aqueous dispersion containing one or more clays, deionized water, and an ion exchange resin. The dispersion is stirred for a certain time and temperature. Preferably, the aqueous dispersion is stirred for a period of 2 to 24 hours, preferably 4 to 12 hours, and even more preferably 6 to 10 hours. The temperature conditions at which the aqueous dispersion is stirred is preferably from 20° C. to 120° C., more preferably from 50° C. to 100° C., and most preferably from 60° C. to 80° C. The ion exchange resin is removed from the dispersion, preferably through filtration or similar means, to provide an acid clay and water mixture.

In certain embodiments of the present invention, the clay within the acid clay and water mixture may be hydrophobically modified through exposure to a basic compound. The "basic compound", as used herein, relates to any compound capable of interacting with the acid clay such as accepting a proton from the acid clay. Advantageously, this interaction results in the production of water, such as the reaction of a quaternary ammonium hydroxide with an acid clay, as opposed to the typical practice of treating the acid clay with quaternary ammonium halide. Examples of basic compounds that may be used in the present invention include, but are not limited to, water soluble bases, such as primary, secondary, or tertiary amines, or hydroxides of a pyridine base or a quaternary ammonium. Among the preceding examples, quaternary ammonium hydroxide is preferred. The use of quaternary ammonium hydroxide over an analogous compound such as a chloride results in a product with lower salt content. The basic compound may be added to the acidic clay through combining an aqueous solution having the basic compound into the acid clay and water mixture. Alternatively, the basic compound may be added neat. The amount of basic compound which is added to the acid clay and water mixture is preferably from 0.1 to 3, more preferably from 0.2 to 1.5, and most preferably from 0.5 to 1.2 meq/g based on the CEC of the clay in the aqueous dispersion.

The aqueous solution having the basic compound and the acid clay and water mixture, or the combined mixture, are stirred under certain time and temperature conditions to hydrophobically modify the clay. Preferably, the combined mixture is stirred for a period of 2 to 24 hours, more preferably 4 to 12 hours, and most preferably 6 to 10 hours. The temperature conditions at which the combined mixture is stirred is preferably from 60° C. to 120° C., more preferably from 70° C. to 110° C., and most preferably from 80° C. to 100° C. The clay is removed from the combined mixture, preferably through filtration or similar means, rinsed, dried to remove excess water from the clay, and ground to yield a hydrophobically modified clay.

In accordance with the methods of the present invention, the first and second aqueous reaction mixtures, or aqueous mixture and aqueous clay dispersion, are multi-stage emulsion polymerized. Such multi-stage emulsion polymerization preferably involves the sequential polymerization of two or more monomer mixtures wherein the monomers of the first monomer mixture are polymerized to more than 80%, preferably more than 90%, and even more preferably more than 95% degree of conversion to form a polymer particle dispersion. This polymerization is preferably followed by the polymerization of a second monomer mixture containing the clay dispersion in the presence of the polymer particle dispersion to form additional polymers which may associate with the polymer particles (e.g., polymer shells around or domains within the polymer particles) and/or form additional polymer particles.

In another aspect of the present invention, an aqueous dispersion may be prepared by a multistage emulsion polymerization process, in which at least two stages that differ in composition are polymerized in sequential fashion. Such a process usually results in the formation of at least two mutually incompatible polymer compositions, thereby resulting in the formation of at least two phases within the polymer particles in the aqueous nancomposite dispersion. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases, the majority of the surface area of the particle will be occupied by at least one outer phase and the interior of the particle will be occupied by at least one inner phase. Each of the stages of the multi-staged emulsion polymers within the aqueous nancomposite dispersion may contain the same monomers, surfactants, redox initiation system, chain transfer agents, etc. as disclosed herein-above for the emulsion polymer. The polymerization techniques used to prepare such multistage emulsion polymers are well known in the art such as, for example, U.S. Pat. Nos. 4,325,856; 4,654,397; and 4,814,373.

During this step, it should be appreciated that the first and second aqueous reaction mixtures may be multi-stage polymerized in either order. For preparing nanocomposite compositions in the form of dry powders it is preferable that the monomer(s) within the clay-containing mixture, or second aqueous reaction mixture, is polymerized after the monomer(s) within the first aqueous reaction mixture.

In one embodiment of the present invention, the lightly modified clay may be at least partially exfoliated during polymerization of the monomers in the second reaction mixture which contains the monomer and the lightly modified clay. In this embodiment, the clay/monomer mixture may be the first stage of the multi-stage polymerization so that the inner polymer core portion of the multi-stage polymer will preferably contain at least a portion of the lightly modified clay. In another embodiment, this clay/monomer mixture may be the second stage of the multistage polymerization so that the outer polymer shell portion of the multi-stage polymer will typically contain at least a portion of the lightly modified clay. In further embodiments, both stages may contain the lightly modified clay.

The emulsion polymerization step is typically carried out in a suitable reactor wherein the reactants (monomers, initiators, emulsifiers, lightly modified aqueous clay dispersion, and optional chain transfer agents) are suitably combined, mixed, and reacted in an aqueous medium, and wherein heat may be transferred in to, and away from, the reactor. The reactants are typically added slowly (gradually, as in a semi-batch process) over time, continuously, or quickly as a "shot" (batchwise) into the reactor. Typically, the reactants are gradually added ("grad-add") to the reactor.

In other embodiments of the present invention, the polymeric compositions of the present invention may be prepared through techniques other than emulsion polymerization. For example, these compositions may be polymerized, for example, via solution polymerization techniques. Solution polymerization techniques may be used if the heat of polymerization of the monomer or viscosity of the polymer is too high. Preferably, the polymerization occurs in an aqueous medium but other mediums, or solvents, may be used.

Various initiator systems are known in the art of free radical initiation and may be used in the methods described herein. The selection of the initiator system may vary depending upon the polymerization technique used. A thermal initiator, such as, but not limited to, a persulfate salt may be used. Alternatively, a free radical redox initiator system may also be employed. Examples of such systems include, for example, an oxidizing agent or oxidant such as a persulphate, azo, peroxide (e.g., hydrogen peroxide, t-butyl hydroperoxide, t-amylhydroperoxide), and the like, in combination with a reducing agent or reductant such as sodium metabisulphite, sodium bisulfite, sodium sulfoxylate formaldehyde, sodium dithionite, isoascorbic acid, sodium hydrosulphite, 2-hydroxy-2-sulfinatoacetic acid, 2-hydroxysulfonatoacectic acid, and the like.

The free-radical initiators which are typically used in the various steps of the process are those conventionally utilized in free-radical redox polymerizations conducted in the temperature range from 10° C. to 100° C., preferably from 20° C. to 95° C., and more preferably from 55° C. and 90° C. Temperatures higher than 100° C. are possible using equipment that is designed for elevated pressures. In some embodiments involving redox initiation, initiation temperatures are preferably kept below 85° C., more preferably below 55° C. for redox initiation. In other embodiments involving thermal initiation with persulfate salts, temperatures in the range 80° C. to 90° C. are used.

In certain embodiments, the present invention may use a redox process to initiate the modification of the clay surface and to aid in the polymerization of the monomer between the layers of the clay. A relatively large percentage of the weight of clay, typically 2% by weight or greater, comprises redox-active multivalent metal ions such as iron, copper, manganese, and the like, that are present within the galleries and/or the surface layers of the clay. These redox-active multivalent metal ions, inherent within the clay or added to the system, may be used to accelerate radical generation from redox-active initiator components. In the redox process, a clay containing metal ions such as $Fe^{II}$ or $Fe^{III}$ may be reacted in the presence of either an oxidant or a reductant, respectively, to form radicals. Redox-derived radicals will be formed in the spaces between the clay layers or at the clay surface and foster intercalation and/or exfoliation of the clay. Further, redox processes may generate polymer clay nanocomposites that exhibit higher degrees of film clarity than without redox.

In the redox process wherein a clay with $Fe^{II}$ is reacted in the presence of an oxidant, a chemical reductant is added to an aqueous reaction mixture containing clay in its natural $Fe^{III}$ form and, optionally, a surfactant. Preferably, the amount of reductant added is in a sufficient quantity to reduce every mole of iron contained within the clay. Confirmation of the reduction of the clay from its $Fe^{III}$ to $Fe^{II}$ form may be made by observing a color change of the aqueous reaction mixture. The aqueous reaction mixture may become gray/green in appearance. Once the iron has been reduced, a chemical oxidant is added to the aqueous reaction mixture along with one or more monomers. The interaction of $Fe^{II}$ with the oxidants causes an electrochemical reaction which results in the transfer of electrons from the iron associated with the clay to the oxidant. Reduction of the oxidant causes the oxidant to split into an anion and a redox derived radical which can then initiate polymer chains either at the surface of the clay or in the gallery space between clay layers. In this manner, the redox initiation system can be helpful in the intercalation and/or exfoliation of a polymer/clay nanocomposite. This redox process may be used to initiate the polymerization and/or sustain the polymerization throughout the entire nanocomposite formation. In addition, the redox process may be used to alter the CEC value of the clay.

In an alternative embodiment, a $Fe^{III}$ form clay is reacted in the presence of a reductant and a monomer emulsion seed is added to an aqueous reaction mixture containing clay in its natural $Fe^{III}$ form. The reductant interacts with the $Fe^{III}$ groups of the clay and is oxidized which can cause radical formation and subsequent polymer chain initiation at or near the surface of the clay. Once the seed formation is complete, the nanocomposite latex is formed according to the standard methods disclosed herein. This redox process may also be used to initiate the polymerization and/or sustain the polymerization throughout the entire nanocomposite formation. In addition, the redox process may be used to alter the CEC value of the clay.

In certain embodiments wherein the redox system is the sole source of radicals, polymer chain growth may continue to be confined to regions near the clay surface to the extent that the iron is confined either to the clay plates or to the exchange spaces on the surface of the clay. The use of a reductant (such as sodium sulfoxylate formaldehyde, isoascorbic acid, and the like) and oxidant (such as ammonium persulfate, hydrogen peroxide, tert-butyl hydroperoxide, and the like) along with redox-active multivalent metal ions found in the clay or added separately is also a useful method for preparing the polymer/clay nanocomposites of the present invention.

In one embodiment of the present invention, the monomers may be added batch-wise (Ashot@) or fed continuously over time into the reactor. Continuous feeding by gradual addition of the aqueous reaction mixtures into the reactor over a period of time ranging from 0.5 to 18 hours, preferably from 1 to 12 hours, and even more preferably from 2 to 6 hours, is useful for controlling reaction temperature.

Optionally, at least one chain transfer agent may be incorporated during polymerization to control the molecular weight of the polymer. Examples of chain transfer agents include, but are not limited to, mercaptans, polymercaptans, and polyhalogen compounds. Further, non-limiting examples of chain transfer agents include alkyl mercaptans such as ethyl mercaptan, n-propyl mercaptan, n-butyl mercaptan, isobutyl mercaptan, t-butyl mercaptan, n-amyl mercaptan, isoamyl mercaptan, t-amyl mercaptan, n-hexyl mercaptan, cyclohexyl mercaptan, n-octyl mercaptan, n-decyl mercaptan, n-dodecyl mercaptan; mercapto carboxylic acids and their esters, such as methyl mercaptopropionate and 3-mercaptopropionic acid; alcohols such as isopropanol, isobutanol, lauryl alcohol and t-octyl alcohol; and halogenated compounds such as carbon tetrachloride, tetrachloroethylene, and tricholoro-bromoethane. Generally from 0 to 10% by weight, based on the weight of the monomer mixture, can be used. The polymer molecular weight may also be controlled by other techniques, such as selecting the ratio of initiator to monomer.

A stabilizing surfactant may be added to one or both of the reaction mixtures to discourage the aggregation of polymeric latex particles. In general, the growing latex particles are stabilized during emulsion polymerization by one or more surfactants such as an anionic or nonionic surfactant, or a mixture thereof. Examples of surfactants suitable for emulsion polymerization are provided in *McCutcheon's Detergents and Emulsifiers* (MC Publishing Co., Glen Rock, N.J.), published annually. Other stabilizing agents, such as protective colloids, may be used.

Buffers may also be present in the reaction mixture during an emulsion polymerization. Buffers are generally the salts of weak acids such as, but not limited to, sodium bicarbonate, sodium carbonate or sodium acetate. The amount of buffer that may be present, if added, in the reaction mixture may range from 0.01 to 5 weight percent based upon the total monomer used in the polymerization. Generally lower levels of a strong base, such as ammonia or sodium hydroxide, can also be used to control the pH of the polymerization. These agents may be added at any time either before, during, or after the polymerization step. Buffers may be further used to control hydrolysis of certain monomers, influence the extent of premature crosslinking during polymerization (as in the case when N-methylolacrylamide monomer is employed), influence the rate of decomposition of initiators, and/or affect the extent of dissociation of carboxylate acid monomers and surfactants to control colloidal stability.

The first mixture of monomers may be polymerized in the presence of a pre-formed polymer dispersion ("seed" latex), for controlling the desired particle size. Seeds are also typically used for controlling the structure and/or morphology of the resulting polymer. The "seed" latex may comprise small particles depending upon the desired use of the resulting emulsion polymer. In certain embodiments, the particles may have a mean diameter less than 200 nm, preferably less than 100 nm, and even more preferably less than 65 nm. In other embodiments, such as when larger emulsion polymer particle size is desired, the particles may have a mean diameter less than 250 nm, preferably less than 200 nm, and even more preferably less than 110 nm. Typical seed latex particles may have a composition similar to, or different than, the composition of the monomers used in preparing the first stage of the multistage nanocomposite or the first stage of a seeded single stage nanocomposite polymer. The pre-formed polymer dispersion may include polymer particles of a rubbery material, and may be similar or different in composition to the core polymer. The term Arubbery@, as used herein, denotes the thermodynamic state of a polymer above its glass transition temperature. Alternatively, the seeds may include hard non-rubbery polymer particles, (e.g., polystyrene or polymethyl methacrylate), which may be used for adjusting refractive index, as taught in Myers et al., U.S. Pat. No. 3,971,835.

Another process of the present invention involves the gradual addition and polymerization of an aqueous emulsion comprising at least one ethylenically unsaturated monomer and a lightly modified, layered clay to one or more emulsion polymer seeds. In this process, the emulsion polymer seeds preferably have a particle diameter of 20 to 500 nm, more preferably 30 to 400 nm, and even more preferably 40 to 300 nm. The emulsion polymer seeds are from 0.1 to 10%, preferably 0.5% to 8%, even more preferably 1% to 5% based on dry weight of the total polymer weight in the nanocomposite dispersion. In a further embodiment, the polymer seeds may contain up to 200% clay based on dry polymer weight of the total polymer weight in the emulsion polymer seed.

The aqueous emulsion in this process contains 80 to 99.95%, preferably 85 to 99.9%, and even more preferably from 90 to 99.9% based on dry weight of the total dry polymer weight in the nanocomposite dispersion of at least one ethylenically unsaturated monomer, and 0.05% to 25%, preferably from 0.1% to 15%, and even more preferably from 0.1% to 10%, based on dry weight of total dry polymer weight in said nanocomposite of a lightly modified, layered clay.

After polymerization of each stage it is desirable that at least 95%, preferably at least 97%, and even more preferably at least 99% based on weight of the monomer is polymerized in a reactor before a subsequent polymerization stage is begun.

In certain embodiments of the present invention, the first aqueous reaction mixture comprises a dispersion containing a plurality of polymer seeds which are present in the emulsion in an amount ranging from 0.1 to 20, preferably 0.1 to 15, and more preferably 0.1 to 10% based on dry weight of total dry polymer weight in the resulting nanocomposite dispersion. An aqueous emulsion, comprising at least 0.1 to 20% of a lightly modified clay based on dry weight of total dry polymer weight in said nanocomposite, is added preferably on a gradual basis to the dispersion. The aqueous emulsion further comprises at least one ethylenically unsaturated monomer which is preferably an acid containing monomer. At least a portion of the monomer is then polymerized thereby forming the polymer clay nanocomposite dispersion. In certain embodiments, the polymer seeds are formed in the same reaction vessel in which the monomer is polymerized. In these embodiments, the polymer seed may comprise up to 200 weight percent clay based on dry polymer weight of the polymer seed. The lower percentage solids within the reactor vessel allows one to add higher clay levels while maintaining a usable viscosity. Alternatively, the aqueous dispersion comprising the polymer seeds may be gradually introduced or added to the reactor vessel wherein the monomer is polymerized. In these embodiments, the polymer seeds may comprise from 0.1 to 25% based upon dry weight of a lightly modified, layered clay.

The present invention also encompasses nanocomposite polymer particles that are formed in prior polymerization or additional polymerization stages. These stages may occur before, during, or after the formation of the stage containing the clay. Accordingly, the first stage core polymer particle may contain a rubbery polymer. Aqueous dispersions of nanocomposites containing rubbery polymers materials are useful in a number of applications, such as: plastics additive impact modifiers; thermoplastic resins having flexibility and/or good impact strength such as for capstock applications; thermoplastic elastomers; binders for coatings, caulks, sealants, and adhesives, and the like.

For preparing materials that have a rubbery component, it is desirable that the glass transition temperature of at least one constituent polymeric phase be less than the use temperature (e.g., ca. 25° C. for applications used at ambient conditions). The selection and amount of monomers required for controlling the glass transition may be readily determined through use of the Fox equation that is well known in the polymer art.

The polymers may also contain at least one additional polymer derived from at least one of any of the aforementioned ethylenically unsaturated copolymerizable monomers to form copolymers (e.g., random copolymers, block copolymers, graft copolymers, star polymers, and various combinations thereof).

In one embodiment of the process of the present invention, the first aqueous reaction mixture may be polymerized to form a first stage emulsion polymer core particle having a particle diameter of 20 to 7000 nanometers, preferably 50 to 2000 nanometers, and even more preferably 50 to 800 nanometers. In this embodiment, the polymer is about 0.1 to 99% based on dry weight of the total dry polymer weight in the nanocomposite dispersion, and a second aqueous reaction mixture may be polymerized to form a second stage emulsion polymer shell around said core particle.

Larger core shell nanocomposites, e.g. 1,000 nanometers or greater, may be formed by polymerization techniques other than emulsion polymerization. These larger core shell nanocomposites may be formed via suspension polymerization as disclosed herein or via "swelling techniques" such as the techniques disclosed, for example, in "Aqueous Dispersions of Polymer-Oligomer Particles", Polymer Colloids II, Robert Fitch editor, Plenum Press, New York, N.Y., 1980, pp. 83-93. For example, a latex may be prepared by conventional emulsion polymerization techniques. After polymerization, the latex is then swollen with monomer and a chain transfer agent and the monomer is then polymerized to form an oligomer in an aqueous dispersion. The aqueous dispersion of the oligomer and an emulsifier is then swollen with monomer and polymerized to provide larger sized particles. A lightly modified clay may be added at some point during the process to provide a large core shell nanocomposite. These larger core shell nanocomposites may be useful as-is or, for example, as cores in plastics additives.

In another embodiment of the present invention, a nanocomposite polymer composition having a core-shell morphology is provided containing a rubbery first stage polymer and a second stage nanocomposite shell. This nanocomposite polymer composition may contain from 1 to 99, preferably 30 to 70, more preferably 35 to 60, and even more preferably from 35 to 45 parts based on weight of a rubbery first stage core polymer, and from 99 to 1, preferably 70 to 30, more preferably from 40 to 65, and even more preferably from 55 to 65 parts based on weight of a second stage nanocomposite shell. The term "parts" used herein is intended to mean "parts based on weight".

In the core-shell nanocomposite polymer composition, the rubbery first stage core polymers contain from 45 to 99.9, preferably from 80 to 99.5, and even more preferably from 94 to 99.5 weight percent of units derived from at least one $C_1$-$C_8$ alkyl acrylate monomer. These polymers also contain from 0 to 35, preferably from 0 to 20, and even more preferably from 0 to 4.5 weight percent of units derived from at least one ethylenically unsaturated copolymerizable monomer different from the at least one $C_1$-$C_8$ alkyl acrylate monomer. These first stage core polymers further contain from 0.1 to 5, preferably from 0.1 to 2, and even more preferably from 0.5 to 1.5 weight percent based on weight of units derived from at least one crosslinker or graftlinker.

In the core-shell nanocomposite polymer composition, the second stage nanocomposite shell has a percent weight of lightly modified clay to the total dry polymer weight in the range of from 0.05% to 25%, preferably from 0.2% to 15%, and even more preferably from 0.5% to 10%, with the balance a polymer derived from at least one ethylenically unsaturated units selected from the group consisting of $C_1$-$C_{18}$ alkyl (meth)acrylate, acrylic acid, methacrylic acid, butadiene, and vinyl aromatic monomers. In this embodiment, the shell is typically hard; hard shells generally allow the nanocomposite polymer compositions to be provided in a dry powder form. Dry powder forms of nanocomposites containing relatively soft shells can be provided using various powder flow aids as is known in the art of powder preparation. Moreover, the shell may be hard or soft if the nanocomposite polymer is used in its aqueous dispersion form (e.g., coating, adhesives, caulks, sealants, and plastics additives).

The polymer nanocomposite powders of the present invention may also be isolated from the nanocomposite polymer particle dispersions in various ways. Some non-limiting examples of powder isolation methods include spray-drying or coagulation. Additional techniques to isolate the polymer nanocomposite particles include, for example, the techniques disclosed in U.S. Pat. No. 4,897,462. These techniques may also be applied to the emulsion during isolation to produce a spheroidal product which, when dried, exhibits outstanding powder flow, low dusting, and higher bulk density than conventionally isolated powders.

The polymer nanocomposite powders may further contain from 0 to 5 parts based on weight of a powder flow aid. Suitable powder flow aids may be incorporated in the spray drying process used for recovering dry powder capstock compositions. One non-limiting example of a powder flow aid is stearic acid-coated calcium carbonate. The reference, U.S. Pat. No. 4,278,576, also provides further examples of flow aids that may be useful for spray drying emulsions of polymer particles.

The process of the present invention is typically used for preparing nanocomposite resin powders having the requisite processing and physical characteristics of thermoplastic resin. As described above, dry powders of the nanocomposite polymers are typically prepared by recovering the particles either by spray drying or by coagulation followed by wet-cake drying. These nanocomposite polymers may be recovered separately as individual powders which are subsequently mixed together using a suitable powder mixing device (e.g., ribbon blender) to prepare a dry powder mixture which may be used as a thermoplastic resin. Alternatively, the separate lightly modified aqueous clay dispersions and clay-free emulsion polymers may be blended in the emulsion state and subsequently recovered as a mixed dry powder blend by either co-spray drying or coagulation followed by drying.

Additional components in the nanocomposite resin composition, such as UV stabilizers, pigments, PVC resin, matting agents, flow aids, processing aids, lubricants, fillers, and the like, may be blended in either powder or liquid form with the nanocomposite resin powders. These components may be used, for example, in base resins for a capstock composition. Individual additives, such as, for example, a UV light stabilizer, may be emulsified, added to the nanocomposite resin particle dispersions, and co-spray-dried. Alternatively, emulsified additives, such as pigment dispersion may be added directly to nanocomposite resin powders in a suitable mixing device which allows for the addition of heat and the removal of water. Likewise, PVC wetcake may also be blended with powder or aqueous-based nanocomposite resin particle dispersions. Numerous combinations of mixing emulsion-based additives and powders followed by subsequent drying may be envisioned by one skilled in the art.

In another embodiment a pelletized form of the polymer nanocomposite composition is envisioned. Such pellets may be used, for example, in preparing thermoplastic film, sheet, and other various articles. In some circumstances, pellet-forms of the polymer nanocomposite may be more desirable than using a powder-form to avoid certain problems common to powders, such as dust formation. Accordingly, powders may be formed into pellets using any suitable plastics pelletization equipment or other methods known in the plastics processing art. These pellet forming steps may be combined with the mixing step wherein the components of the polymer nanocomposite resin composition may be compounded (mixed) and then pelletized using standard plastics processing equipment.

Another process of the present invention involves preparing an aqueous nanocomposite dispersion by admixing an aqueous emulsion polymer and 0.1 to 25% based on dry weight of said emulsion polymer, of a lightly modified, layered clay. In this process, the aqueous emulsion polymer is typically prepared according to any of the various known methods of preparing emulsion polymers according to the art of emulsion polymerization. In one embodiment of this process it is typical that the nanocomposite dispersions are prepared using gradual addition "grad-add" processes. In this embodiment it is also typical that the nanocomposite polymers are prepared by multi-stage polymerizations, such as core-shell polymer particles having a rubber core and a hard shell. In this embodiment, the amount of clay is in the range of from 0.05% to 25%, preferably from 0.1% to 15%, and even more preferably from 0.1% to 10% based on dry weight of total dry polymer weight in the polymer seeds.

In another embodiment, the clay is predispersed in water and admixed with the aqueous emulsion polymer. Any mechanical mixing device may be suitable as long as the clay particles are at least partially exfoliated. More preferably, the clay particles are mixed to uniformly disperse the clay within the nanocomposite dispersion. For example, a COWLSJ mechanical mixer may be used to prepare aqueous clay dispersions containing up to 25% clay, however it is more preferable to use a mechanical homogenizer to prepare aqueous clay dispersions containing from 0.1 to 10% clay.

The aqueous nanocomposite clay-polymer dispersions of the present invention may also be prepared utilizing inverse emulsion polymerization. The processes described in, for example, U.S. Pat. Nos. 3,284,393, 3,826,771, 4,745,154, and accompanying references therein, can be utilized incorporating clay into the aqueous phase of these polymerizations when used to make an acid containing polymer (high or low levels of acid). Other water soluble polymers modified by clay, such as polyacrylamide, may be prepared by this approach. Inverse emulsion polymerization methods may yield high molecular weight polymers or copolymers based on the water soluble monomers and mixtures comprised thereof. An aqueous solution of these monomers may be dispersed in an oil phase by means of a water in oil emulsifier and subsequently polymerized under free radical forming conditions.

In other aspects of the present invention, the polymer clay nanocomposite may be prepared by an emulsion polymerization process which is executed in such a manner to produce a bimodal or mutimodal particle size distribution as is taught in U.S. Pat. Nos. 4,247,438; 4,657,966; and 5,498,655, a bimodal or multimodal molecular weight distribution as is taught in U.S. Pat. Nos. 4,501,845 and 5,990,228, or non spherical particles such as, for example, rods as are taught in U.S. Pat. No. 5,369,163 and multilobal particles as are taught in U.S. Pat. No. 4,791,151.

In another aspect of the present invention, a hollow polymer clay nanocomposite, or opaque polymer clay nanocomposite, may be prepared by a process which produces particles which when dry contain at least one void such as, for example, particles having a single void, multivoided particles, and particles having interpenetrating networks of void and polymer (polymer "sponge"). In this connection, the hollow polymer clay nanocomposite may be formed via any of the methods disclosed, for example, in U.S. Pat. Nos. 4,468,498; 5,545,695; and 6,252,004 and accompanying references therein. Preferably, the hollow polymer clay nanocomposite is formed by providing an aqueous emulsion of a multi-stage emulsion polymer comprising: a core stage polymer comprising an aqueous polymer clay nanocomposite composition comprised of polymerized units of at least one unmodified clay, at least one ethylenically unsaturated monomer, and at least one modifying agent; and a shell stage polymer comprising polymerized units of at least one ethylenically unsaturated monomer. Preferably, at least one of the ethylenically unsaturated monomers comprises an acid containing monomer such as the acid containing monomers disclosed herein. The clay is preferably lightly modified via a modifying agent such as a surfactant prior to the formation of the shell stage polymer. The core stage polymer is then swollen with at least one swelling agent and optionally at least one ethylenically unsaturated monomer such that at least a portion of the core stage polymer contacts at least a portion of the shell stage polymer. The swelling agent may include polymerizing the monomer to form the polymer clay nanocomposite particles which become hollow upon drying.

Suitable ethylenically unsaturated monomers may include styrene, α-methyl styrene, p-methyl styrene, t-butyl styrene, vinyltoluene, ethylene, vinyl acetate, vinyl chloride, vinylidene chloride, (meth)acrylonitrile, (meth)acrylamide, ($C_1$-$C_{20}$) alkyl or ($C_3$-$C_{20}$) alkenyl esters of (meth)acrylic acid, such as methyl (meth)acrylate, ethyl (meth)acrylate, butyl (meth)acrylate, 2-ethylhexyl (meth)acrylate, hydroxyethyl(meth)acrylate, hydroxypropyl(meth)acrylate, benzyl (meth)acrylate, lauryl (meth)acrylate, oleyl (meth)acrylate, palmityl (meth)acrylate, stearyl (meth)acrylate and the like. The core may also optionally contain less than 20 percent by weight, preferably from 0.1 to 3 percent by weight, based on the total weight of the core, of polyethylenically unsaturated monomer such as a graft-linker.

The core, whether obtained by a single stage process or a process involving several stages, has an average particle size of from 50 nm to 1.0 micron, preferably from 100 nm to 300 nm, diameter in unswollen condition. If the core is obtained from a seed polymer, the seed polymer preferably has an average particle size of from 30 run to 200 nm.

As mentioned previously, the core stage polymer is swollen with at least one swelling agent and at least one ethylenically unsaturated monomer such that at least a portion of the core stage polymer contacts at least a portion of the shell stage polymer. The swelling, or expansion, of the core may involve partial merging of the outer periphery of the core into the pores of the inner periphery of the shell and also partial enlargement or bulging of the shell and the entire particle overall. Suitable swelling agents include, are those which, in the presence of the multistage emulsion polymer and monomer, are capable of permeating the shell and swelling the core. Swelling agents may be aqueous or gaseous, volatile or fixed bases or combinations thereof. Suitable swelling agents include volatile bases such as ammonia, ammonium hydroxide, and volatile lower aliphatic amines, such as morpholine, trimethylamine, and triethylamine, and the like; fixed or permanent bases such as potassium hydroxide, lithium hydroxide, zinc ammonium complex, copper ammonium complex, silver ammonium complex, strontium hydroxide, barium hydroxide and the like. The amount of swelling agent can be less than, equal to or greater than the amount needed to provide for complete neutralization of the core. Preferably, the amount of swelling agent is in the range of from 75 to 300 percent, more preferably in the range of from 90 to 250 percent based on the equivalents of the functionality in the core capable of being neutralized. It is also preferable to add the one or more swelling agents to the multistage emulsion polymer while the multistage emulsion polymer is at an elevated temperature, preferably at a temperature within 10° C. of the shell polymerization temperature. Swelling is generally very efficient under conditions of elevated temperature, in the presence of an ethylenically unsaturated monomer, such as the monomers disclosed herein, and no substantial polymerization occurring. Under these conditions, swelling is generally complete within 30 minutes, preferably within 20 minutes, most preferably within 10 minutes of adding the one or more swelling agents. After the core stage polymer is swollen, the monomer is then polymerized to form the polymer clay nanocomposite particles that become hollow after drying.

In another aspect of the present invention, the polymer clay nanocomposite may be prepared by a process which produces particles which may function in a manner instead of or in addition to providing binder functionality. Contemplated are emulsion polymers which function as pigment dispersants or thickeners/rheology modifiers such as alkali-soluble, acid-soluble, and hydrophobically-modified alkali-soluble or acid-soluble emulsion polymers.

The aqueous nanocomposite clay-polymer dispersions may be useful, for example, as coatings, sealants, caulks, adhesives, and as plastics additives. The coating compositions comprising aqueous nanocomposite clay-polymer dispersions may exhibit improved properties like block, print and dirt pick-up resistance, enhanced barrier properties, and enhanced flame resistance. Additionally, the coating compositions comprising the aqueous nanocomposites of the present invention may have the ability to utilize softer binders, without the need for additional coalescant (solvents) for film formation, and still maintain sufficient hardness, toughness and lower tack in a dried film. Suitable applications for the coating compositions of the present invention may include architectural coatings (particularly low VOC applications for semi-gloss and gloss); factory applied coatings (metal and wood, thermoplastic and thermosetting); maintenance coatings (e.g., over metal); automotive coatings; concrete roof tile coatings; elastomeric roof coatings; elastomeric wall coatings; external insulating finishing systems; and inks. It is further contemplated that the aqueous nanocomposite dispersions, when provided as an additive to a coating application, may impart hardness. A further application for the aqueous nanocomposite dispersion is for an opaque polymer and hollow sphere pigments. The inclusion of the aqueous nanocomposite dispersions may provide, for example, harder, more collapse resistant shells or may be suitable for the modification of fibers. Yet further non-limiting examples of applications for the aqueous clay-polymer nanocomposite dispersions: polish; binders (such as binders for nonwovens, paper coatings, pigment printing, or ink jet); adhesives (such as pressure sensitive adhesives, flocking adhesives, or other water based adhesives); plastics additives; ion exchange resins; hair fixatives; caulks; traffic paint; and sealants. The aqueous clay-polymer nanocomposite dispersion may impart strength and toughness to the aforementioned applications.

In one embodiment of the present invention, the aqueous nanocomposite dispersions are capable of forming films upon drying (e.g., coatings and adhesives). In this embodiment, it is preferred that the polymers of the nanocomposites have a glass transition temperature in the range of from −80° C. to 50° C. Glass transition temperatures may be calculated by using the Fox equation (see T. G. Fox, Bull. Am. Physics Soc., Vol. 1, Issue No. 3, page 123(1956)).

In another embodiment of this invention, caulking and sealant compositions containing an aqueous nanocomposite dispersion are provided. The various components, processes, and uses of the aforementioned coating compositions are preferably applicable to these nanocomposite-containing caulking and sealant compositions. In addition, caulking and sealant compositions preferably have a paste-like or gel-like consistency and preferably have higher viscosities than do coatings. Accordingly, caulks and sealants can be prepared using the aqueous nanocomposite dispersions of the present invention according to the general formulations known in the art of preparing caulks and sealants from emulsion polymers. In this embodiment, caulks and sealants can be prepared by blending fillers with the aqueous nanocomposite dispersions according to methods known in the art.

In some embodiments of this invention, the aqueous nanocomposite dispersions desirably form films upon drying, with or without the addition of plasticizers or coalescents (e.g., coatings and adhesives). In these embodiments, it is preferred that the polymers of the nanocomposites have glass transition temperatures in the range of from −80° C. to 10° C.

In one embodiment of the present invention, a coating composition containing an aqueous nanocomposite dispersion is prepared. The coating composition of this invention may include, for example, coating or paint compositions which may be described in the art as architectural coatings, maintenance coatings, factory-applied coatings, automotive coatings, elastomeric wall or roof coatings, exterior insulating finishing system coatings, paper or paperboard coatings, overprint varnishes, fabric coatings and backcoatings, leather coatings, cementitious roof tile coatings, and traffic paints. Alternatively, the coating or paint compositions may be described as clear coatings, flat coatings, satin coatings, semi-gloss coatings, gloss coatings, primers, textured coatings, and the like. In these embodiments, it is preferred that the polymers of the nanocomposites have glass transition temperatures in the range from 0° C. to 70° C.

The coating compositions of the present invention may further include pigments and/or fillers such as, for example, titanium dioxide, iron oxide, zinc oxide, magnesium silicate, calcium carbonate, organic and inorganic colored pigments, and clays other than layered clay. Such pigmented coating compositions typically contain from 3 to 70% pigment on a volume basis, or more preferably from 15 to 60% titanium dioxide on a volume basis. The coating composition may be prepared by techniques that are well known in the coatings art. First, optionally, at least one pigment is dispersed within an aqueous medium under high shear such as is afforded by a COWLES® mixer or, alternatively at least one predispersed pigment may be used. Then, the aqueous nanocomposite dispersion may be added under low shear stirring along with other coatings adjuvants, as desired. Alternatively, the aqueous nanocomposite dispersion may be included in the optional pigment dispersion step. The coating composition may also contain conventional coatings adjuvants such as, for example, tackifiers, emulsifiers, coalescing agents, plasticizers, buffers, neutralizers, thickeners or rheology modifiers, humectants, crosslinking agents including heat-, moisture-, light-, and other chemical- or energy-curable agents, wetting agents, biocides, plasticizers, antifoaming agents, colorants, waxes, water repellants, slip or mar aids, anti-oxidants, and the like. The coating composition, in addition to the aqueous nanocomposite dispersion described herein, may also contain at least one additional polymer, preferably an additional emulsion polymer(s) selected from film-forming and non-film-forming emulsion polymers, including, but not limited to polymeric pigments, such as solid particles, particles having a single void, or multivoided particles. These additional polymers, if added to the coating composition of the present invention, may be present at a level of 0-200%, based on dry weight of the total dry polymer weight in the nanocomposite dispersion.

The solids content of the coating composition may be from 10% to 70% by volume. The viscosity of the coating composition may be from 0.05 to 100 Pascal-seconds (Pa.s), or 50 to 100,000 centipoise (cP), as measured using a Brookfield viscometer; the viscosities appropriate for different application methods vary considerably.

The coating composition may be applied by conventional application methods such as, but not limited to, brushing and spraying methods, roll coating, doctor-blade application, printing methods, air-atomized spray, air-assisted spray, airless spray, high volume low pressure spray, air-assisted airless spray, air knife coating, trailing blade coating, curtain coating, and extrusion.

The coating composition may be applied to a substrate such as, for example, paper or paperboard; consolidated wood products; glass; plastic; wood; metal; primed or previously painted surfaces; weathered surfaces; asphaltic substrates; ceramics; leather; and hydraulic substrates such as cement in 'green' or cured form, concrete, gypsum, and stucco. The coating composition applied to the substrate is typically dried, or allowed to dry, at a temperature from 10° C. to 95° C.

In another embodiment of this invention, an adhesive composition containing an aqueous nanocomposite dispersion is contemplated. The adhesive compositions may include, for example, those known in the art as pressure sensitive adhesives, laminating adhesives, packaging adhesives, hot melt adhesives, reactive adhesives, flocking adhesives, and flexible or rigid industrial adhesives. In these embodiments it is preferred that the polymers of the nanocomposites have glass transition temperatures in the range of from −80° C. to 80° C. The adhesives are typically prepared by admixing optional pigment and the optional adjuvants listed herein above as coatings adjuvants. The adhesive compositions are typically applied to substrates including plastic substrates such as film, sheet, and reinforced plastic composites; metal foil; fabric; metal; glass; cementitious substrates; and wood or wood composites. Application to the substrates is typically effected on machine by transfer roll coater, e.g., or by manual application devices.

In another embodiment of this invention, a caulk or sealant composition containing an aqueous nanocomposite dispersion is contemplated. In these embodiments it is preferred that the polymers of the nanocomposites have glass transition temperatures in the range of from −80° C. to 0° C. The caulk or sealant compositions are typically prepared by admixing pigment and such optional adjuvants listed hereinabove as coatings adjuvants as are appropriate. The caulk and sealant compositions are typically prepared at high solids content level such as 70 wt. % and above in order to minimize shrinkage on drying and consequently, may have a gel-like or paste-like consistency. Caulk and sealant compositions are typically applied to fill and/or seal junctions of substrates including metal; glass; cementitious substrates; wood or wood composites; and combinations thereof and are typically allowed to dry under ambient conditions.

In another embodiment of this invention, an ink composition containing an aqueous nanocomposite dispersion is contemplated. The ink compositions may include, for example, those known in the art as flexographic inks, gravure inks, ink jet inks, and pigment printing pastes. In these embodiments it is preferred that the polymers of the nanocomposites have glass transition temperatures in the range of from −50° C. to 50° C. The inks are typically prepared by admixing optional pigment, predispersed pigment, or dyes and the optional adjuvants listed herein above as coatings adjuvants. The ink compositions are typically applied to substrates including plastic substrates such as film, sheet, and reinforced plastic composites; paper or paperboard; metal foil; fabric; metal; glass; cloth; and wood or wood composites. Application to the substrates is typically effected on machine by flexographic blankets, gravure rolls, and silk screens.

In another embodiment of this invention, a nonwoven fabric binder containing an aqueous nanocomposite dispersion is contemplated The nonwoven binder compositions may include, for example, those known in the art as binders for consumer and industrial nonwovens such as wipes and interlining, binders for insulating nonwovens such as fiberfill and fiberglass, and binders/strengthening agents for nonwovens and paper such as oil filter paper. In these embodiments it is preferred that the polymers of the nanocomposites have glass transition temperatures in the range of from −60° C. to 50° C. The nonwoven fabric binders are typically prepared by admixing optional pigment, and the optional adjuvants listed herein above as coatings adjuvants, as appropriate. The nonwoven fabric binder compositions are typically applied to substrates including nonwovens formed from cellulosic fibers such as paper and rayon; synthetic fibers such as polyester, aramid, and nylon; glass fibers and mixtures thereof. Application to the substrates is typically effected on machine by saturation bath, roll coater, spray, or the like.

In another embodiment of this invention, a polish containing an aqueous nanocomposite dispersion is contemplated. The polish compositions may include, for example, those known in the art as floor polishes, furniture polishes, and automobile polishes. In these embodiments it is preferred that the polymers of the nanocomposites have glass transition temperatures in the range of from 0° C. to 50° C. The polishes are typically prepared by admixing optional pigment, and the optional adjuvants listed herein above as coatings adjuvants, as appropriate, particularly waxes. The polish compositions are typically applied to substrates including wood, vinyl or polyurethane flooring, ceramic tiles, painted metal, and the like. Application to the substrates is typically effected by spray, roller, mop, or the like.

In another embodiment of this invention, a plastics additive containing an aqueous nanocomposite dispersion is contemplated. The plastics additive compositions may include, for example, those known in the art as processing aids and impact modifiers. In these embodiments it is preferred that the polymers of the nanocomposites have glass transition temperatures in the range of from −50° C. to 50° C. The plastics additives are typically prepared by admixing optional pigment, and the optional adjuvants listed herein above as coatings adjuvants, as appropriate, and, typically, drying the composition to a powdered form. The plastics additives compositions are typically mixed with the plastic such as, for example, polyvinyl chloride, polymethyl metbacrylate and polypropylene, by milling or extrusion.

In a further aspect of the present invention, a digital imaging composition incorporating an aqueous nanocomposite dispersion and/or nanocomposite particles is contemplated. The term "digital imaging" as used herein generally relates to compositions that allow the reproduction of an image onto a substrate. Suitable applications for digital imaging compositions include toners for electrophotography such as xerography or compositions for ink jet printers or similar applications. The Tg and particle size for digital imaging compositions varies depending upon its method or system of use. Generally, digital imaging compositions for ink jet applications may have a lower particle size and Tg compared to the particle size and Tg for digital imaging compositions for electrophotography applications. For example, typical Tg values for ink jet applications may range from 45° C. to 60° C. whereas Tg values for electrophotography applications may range from 55° C. to 85° C. Further, non-limiting variables such as viscosity, surface tension, and pH of the digital imaging composition may also be adjusted based upon the end use of the composition.

In another aspect of the present invention, the emulsion polymer of the nanocomposite may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer may contain the same monomers, surfactants, chain transfer agents, etc. as disclosed herein-above for the emulsion polymer. In the case of a multi-staged polymer particle the Tg for the purpose of this invention is to be calculated by the Fox equation using the overall composition of the emulsion polymer without regard for the number of stages or phases therein. The polymerization techniques used to prepare such multistage emulsion polymers are well known in the art such as, for example, U.S. Pat. Nos. 4,325,856; 4,654,397; and 4,814,373.

EXAMPLES

Example 1

Polymerizable or Non-migratory Surfactant ("NMS-1") with 2% PGV Clay, Staged Acid A latex was synthesized via the following method: To an empty reactor kettle was added 612.00 g DI water, 8.00 g polymerizable anionic surfactant (allylammonium salt; 12.8% aqueous solution), 20.40 g of PGV clay ("PGV" is the trade name for a sodium montmorillonite clay sold by Nanocor, Arlington Heights, Ill.). 7.55 g methacrylic acid, and 3.10 g sodium carbonate. A monomer emulsion was formed containing 426.60 g water, 19.90 g polymerizable allylammonium anionic surfactant or non-migratory surfactant ("NMS") provided by Stepan of Northfield, Ill. (12.8% aqueous solution), 662.00 g Butyl Acrylate, 342.70 g Methyl Methacrylate, and 7.55 g methacrylic acid. The kettle contents were heated to 85° C. A 55.80 g quantity of the monomer emulsion was added to the kettle to form a polymer seed. Then, 4.03 g ammonium persulfate (dissolved in 28 g water) was added to initiate polymerization. The monomer emulsion was fed into the kettle such that a reactor temperature of 85° C. was maintained. After monomer feeds were completed, the batch was cooled to 65° C. Upon reaching 65° C., 5.58 g ferrous sulfate (0.15% aqueous) was added to the reactor. Then, a 1.12 g quantity of 70% tert-butyl hydroperoxide in 20 g of water was added along with a 0.56 g quantity of isoascorbic acid in 20.00 g water. The temperature was reduced to below 45° C. The pH of the batch was raised to 7.5 using ammonium hydroxide (28% aqueous) and a bactericide (4.77 g Kathon LX (1.4% aqueous) with 6.20 g water) was added. The sample was filtered through a 100 mesh screen to remove any large pieces of coagulated material.

Example 2

Polymerizable or Non-Migratory Surfactant ("NMS-1") with 5% PGV Clay, Staged Acid A latex was synthesized via the following method: To an empty reactor kettle was added 612.00 g DI water, 8.00 g polymerizable anionic surfactant (allylammonium salt; 12.8% aqueous solution), 51.00 g of PGV clay (Na$^+$ montmorillonite) 7.55 g methacrylic acid, and 3.10 g sodium carbonate. A monomer emulsion was formed containing 426.60 g water, 19.90 g polymerizable allylammonium anionic surfactant (12.8% aqueous solution), 662.00 g Butyl Acrylate, 342.70 g Methyl Methacrylate, and 7.55 g methacrylic acid. The kettle contents were heated to 85° C. A 55.80 g quantity of the monomer emulsion was added to the kettle to form a polymer seed. Then, 4.03 g ammonium persulfate (dissolved in 28 g water) was added to initiate polymerization. The monomer emulsion was fed into the kettle such that a reactor temperature of 85° C. was maintained. After monomer feeds were completed, the batch was cooled to 65° C., and upon reaching 65° C. 5.58 g ferrous sulfate (0.15% aqueous) was added to the reactor. Then, a 1.12 g quantity of 70% tert-butyl hydroperoxide in 20 g of water was added along with a 0.56 g quantity of isoascorbic acid in 20.00 g water. The temperature was reduced to below 45° C. The pH of the batch was raised to 7.5 using ammonium hydroxide (28% aqueous) and a bactericide (4.77 g Kathon LX (1.4% aqueous) with 6.20 g water) was added. The sample was filtered through a 100 mesh screen to remove any large pieces of coagulated material.

Comparative Example 3

Polymerizable or Non-Migratory Surfactant ("NMS-1") with No Clay, Staged Acid

A latex was synthesized via the following method: To an empty reactor kettle was added 612.00 g DI water, 8.00 g polymerizable allylammonium anionic surfactant (12.8% aqueous solution), 7.55 g methacrylic acid, and 3.10 g sodium carbonate. A monomer emulsion was formed containing 426.60 g water, 19.90 g polymerizable allylammonium anionic surfactant (12.8% aqueous solution), 662.00 g Butyl Acrylate, 342.70 g Methyl Methacrylate, and 7.55 g methacrylic acid. The kettle contents were heated to 85° C. A 55.80 g quantity of the monomer emulsion was added to the kettle to form a polymer seed. Then, 4.03 g ammonium persulfate (dissolved in 28 g water) was added to initiate polymerization. The monomer emulsion was fed into the kettle such that a reactor temperature of 85° C. was maintained. After monomer feeds were completed, the batch was cooled to 65° C., and upon reaching 65° C. 5.58 g ferrous sulfate (0.15% aqueous) was added to the reactor. Then, a 1.12 g quantity of 70% tert-butyl hydroperoxide in 20 g of water was added along with a 0.56 g quantity of isoascorbic acid in 20.00 g water. The temperature was reduced to below 45° C. The pH of the batch was raised to 7.5 using ammonium hydroxide (28% aqueous) and a bactericide (4.77 g Kathon LX (1.4% aqueous) with 6.20 g water) was added. The sample was filtered through a 100 mesh screen to remove any large pieces of coagulated material.

Comparative Example 4

SDBS with 0% PGV Clay, Staged Acid

A latex was synthesized via the following method: To an empty reactor kettle was added 612.00 g DI water, 4.45 g anionic surfactant (23.0% aqueous solution), 7.55 g methacrylic acid, and 3.10 g sodium carbonate. A monomer emulsion was formed containing 426.60 g water, 19.90 g anionic surfactant (23.0% aqueous solution), 662.00 g Butyl Acrylate, 342.70 g Methyl Methacrylate, and 7.55 g methacrylic acid. The kettle contents were heated to 85° C. A 55.80 g quantity of the monomer emulsion was added to the kettle to form a polymer seed. Then, 4.03 g ammonium persulfate (dissolved in 28 g water) was added to initiate polymerization. The monomer emulsion was fed into the kettle such that a reactor temperature of 85° C. was maintained. After monomer feeds were completed, the batch was cooled to 65° C. Upon reaching 65° C., 5.58 g ferrous sulfate (0.15% aqueous) was added to the reactor. Then, a 1.12 g quantity of 70% tert-butyl hydroperoxide in 20 g of water was added along with a 0.56 g quantity of isoascorbic acid in 20.00 g water. The temperature was reduced to below 45° C. The pH of the batch was raised to 7.5 using ammonium hydroxide (28% aqueous) and a bactericide (4.77 g Kathon LX (1.4% aqueous) with 6.20 g water) was added. The sample was filtered through a 100 mesh screen to remove any large pieces of coagulated material.

The nanocomposites or polymers of Examples 1 through 4 were made into sample films of unformulated coatings and tested for the tensile properties of maximum tensile strength and percentage elongation. The test data for each film were collected on a Tinius Olsen Benchtop Universal Testing Machine (manufactured by Tinius Olsen Testing Machine Company, Willow Grove, Pa.). The sample films were pulled at a rate of 5.08 cm/min. The testing machine was calibrated for the film thickness, width, and weight of each sample film. The initial distance between the clamps holding each sample film was 2.54 cm. The testing was conducted in a controlled environment room at a temperature of 22° C. and a humidity level of 50%. The tensile measurements for each film are provided in the following Table I.

TABLE I

Tensile Strength Measurements

| Example | Surfactant | % Clay | Tensile Strength$_{max}$ |
|---------|------------|--------|--------------------------|
| 1 | Polymerizable[1] | 2 | 291 |
| 2 | Polymerizable[1] | 5 | 325 |
| 3 | Polymerizable[1] | 0 | 230 |
| 4 | Standard[2] | 0 | 271 |

[1]Polymerizable surfactant NMS-1 provided by Stepan of Northfield, Ill.
[2]Standard surfactant is SDBS, sodium dodecylbenzene sulfonate, provided by Stepan of Northfield, Ill.

As Table I illustrates, Comparative Example 4, the polymer composition which was made with the standard surfactant, exhibits a higher tensile strength than Comparative Example 4 which was made with the polymerizable surfactant. However, the nanocomposite composition made with the polymerizable surfactant exhibited an improvement in tensile strength with increasing levels of clay.

Example 5

TBA-modified PGV Clay, Staged Acid

A latex was synthesized via the following method: To an empty reactor kettle was added 337.60 g DI water, 4.04 g anionic surfactant (30% aqueous solution), 6.04 g methacrylic acid, and 2.48 g sodium carbonate. A monomer emulsion was formed containing 528.6 g clay (3.05% aqueous dispersion), 255.3 g water, 11.7 g tetrabutylammonium hydroxide ("TBA"), 528.0 g Butyl Acrylate, and 272.0 g Methyl Methacrylate. After stirring this mixture for 45 minutes, 29.6 g anionic surfactant (30% aqueous solution) and 6.0 g methacrylic acid were added to the emulsion. The kettle contents were heated to 85° C. A 44.80 g quantity of the monomer emulsion was added to the kettle to form a polymer seed. Then, 4.03 g ammonium persulfate (dissolved in 28 g water) was added to initiate polymerization. The monomer emulsion was fed into the kettle such that a reactor temperature of 85° C. was maintained. After monomer feeds were completed, the batch was cooled to 65° C., and upon reaching 65° C. 5.58 g ferrous sulfate (0.15% aqueous) was added to the reactor. Then, a 1.12 g quantity of 70% tert-butyl hydroperoxide in 20 g of water was added along with a 0.56 g quantity of isoascorbic acid in 20.00 g water. The temperature was reduced to below 45° C. The pH of the batch was raised to 7.5 using ammonium hydroxide (28% aqueous) and a bactericide (7.8 g Kathon LX (1.4% aqueous) with 4.80 g water) was added. The sample was filtered through a 100 mesh screen to remove any large pieces of coagulated material.

Reference Example 6

0% PGV Clay, Staged Acid

A latex was synthesized via the following method: To an empty reactor kettle was added 122.40 g DI water, 1.01 g anionic surfactant (30% aqueous solution), 1.51 g methacrylic acid, and 0.62 g sodium carbonate. A monomer emulsion was formed containing 158.60 g water, 132.00 g Butyl Acrylate, and 68.00 g Methyl Methacrylate. After stirring this mixture for 45 minutes, 7.4 g anionic surfactant (30% aqueous solution) and 1.50 g methacrylic acid were added to the emulsion. The kettle contents were heated to 85° C. A 11.20 g quantity of the monomer emulsion was added to the kettle to form a polymer seed. Then, 0.80 g ammonium persulfate (dissolved in 5.6 g water) was added to initiate polymerization. The monomer emulsion was fed into the kettle such that a reactor temperature of 85° C. was maintained. After monomer feeds were completed, the batch was cooled to 65° C. Upon reaching 65° C., 1.12 g ferrous sulfate (0.15% aqueous) was added to the reactor. Then, a 0.22 g quantity of 70% tert-butyl hydroperoxide in 4.0 g of water was added along with a 0.11 g quantity of isoascorbic acid in 4.00 g water. The temperature was reduced to below 45° C. The pH of the batch was raised to 7.5 using ammonium hydroxide (28% aqueous) and a bactericide (0.95 g Kathon LX (1.4% aqueous) with 1.20 g water) was added. The sample was filtered through a 100 mesh screen to remove any large pieces of coagulated material.

Reference Example 7

2% Na+PGV Clay, Staged Acid

A latex was synthesized via the following method: To an empty reactor kettle was added 122.40 g DI water, 1.01 g anionic surfactant (30% aqueous solution), 1.51 g methacrylic acid, and 0.62 g sodium carbonate. A monomer emulsion was formed containing 158.60 g PGV clay (Na+ montmorillonite; 2.5% in water), 132.00 g Butyl Acrylate, and 68.00 g Methyl Methacrylate. After stirring this mixture for 45 minutes, 7.4 g anionic surfactant (30% aqueous solution) and 1.50 g methacrylic acid were added to the emulsion. The kettle contents were heated to 85° C. A 11.20 g quantity of the monomer emulsion was added to the kettle to form a polymer seed. Then, 0.80 g ammonium persulfate (dissolved in 5.6 g water) was added to initiate polymerization. The monomer emulsion was fed into the kettle such that a reactor temperature of 85° C. was maintained. After monomer feeds were completed, the batch was cooled to 65° C., and upon reaching 65° C. 1.12 g ferrous sulfate (0.15% aqueous) was added to the reactor. Then, a 0.22 g quantity of 70% tert-butyl hydroperoxide in 4.0 g of water was added along with a 0.11 g quantity of isoascorbic acid in 4.00 g water. The temperature was reduced to below 45° C. The pH of the batch was raised to 7.5 using ammonium hydroxide (28% aqueous) and a bactericide (0.95 g Kathon LX (1.4% aqueous) with 1.20 g water) was added. The sample was filtered through a 100 mesh screen to remove any large pieces of coagulated material.

The nanocomposites or polymers of Examples 5 through 7 were made into sample films of unformulated coatings and tested for the tensile properties of maximum tensile strength and percentage elongation. The test data for each film were collected on a Tinius Olsen Benchtop Universal Testing Machine (manufactured by Tinius Olsen Testing Machine Company, Willow Grove, Pa.). The sample films were pulled at a rate of 5.08 cm/min. The testing machine was calibrated for the film thickness, width, and weight of each sample film. The initial distance between the clamps holding each sample film was 2.54 cm. The testing was conducted in a controlled environment room at a temperature of 22° C. and a humidity level of 50%. The tensile measurements for each film are provided in the following Table II.

TABLE II

Tensile Strength Measurements

| Example | Surfactant | % Clay | Tensile Strength$_{max}$ |
|---|---|---|---|
| 5 | TBA | 2 | 137 psi |
| 6 | — | 0 | 120 psi |
| 7 | Na+ | 2 | 170 psi |

As Table II illustrates, Example 5, the polymer clay nanocomposite composite in which the clay was lightly modified with just TBA, exhibited a higher tensile strength than Example 6. The polymer clay nanocomposite composition which was made with an exchangeable sodium exhibited the highest tensile strength of the samples tested.

We claim:

1. A core-shell polymer clay nanocomposite composition comprising:
   (a) from 10 to 90 parts of a first stage core polymer, and
   (b) from 90 to 10 parts of a second stage nanocomposite shell, wherein the second stage nanocomposite shell comprises:
      (i) from 0.1 to 25 parts of an at least partially exfoliated, lightly modified clay, and
      (ii) from 80 to 99.9 parts of a polymer polymerized from at least one ethylenically unsaturated monomer.

2. An impact modifier comprising the core-shell polymer clay nanocomposite of claim 1.

3. A process for preparing an aqueous nanocomposite dispersion comprising the steps of:
   providing an aqueous dispersion comprising a plurality of polymer seeds having a mean particle diameter ranging from 20 to 500 nanometers, wherein said polymer seeds are present in said emulsion in an amount ranging from 0.1 to 10% based on dry weight of total dry polymer weight in said nanocomposite dispersion;
   adding an aqueous emulsion to said dispersion, wherein said aqueous emulsion comprises 0.1 to 25% based on dry weight of total dry polymer weight in said nanocomposite of at least one lightly modified clay and at least one ethylenically unsaturated monomer; and
   polymerizing said monomer to form a polymer clay nanocomposite dispersion.

4. The process according to claim 3, wherein said polymer seeds comprise 0.1% to 200% clay based on dry weight of a polymer within polymer seed.

5. The process of claim 4, wherein the clay within the polymer seed is lightly modified by a modifying agent.

6. The process according to claim 3, wherein said polymer seeds are formed in the same reactor vessel in which said monomer is polymerized.

7. The process according to claim 3, wherein said polymer seeds are introduced to said reactor vessel in which said monomer is polymerized.

8. The process according to 3, wherein the glass transition temperature of said polymer within the polymer nanocomposite dispersion is in the range of from −80° C. to 140° C.

9. The process according to claim 8, wherein the glass transition temperature of said polymer within the polymer nanocomposite dispersion is in the range of from −80° C. to 50° C.

10. The process of claim 3 wherein at least one of the ethylenically unsaturated monomers within the emulsion comprises an acid containing monomer.

11. The process of claim 3 wherein the emulsion is added to the dispersion on a gradual basis.

12. A coating, adhesive, caulking, or sealant product comprising the aqueous nanocomposite dispersion prepared according to the process of claim 3.

13. The process according to claim 3, wherein the emulsion comprises a redox-active multivalent metal ion.

14. The process according to claim 13, wherein an oxidant is added to the emulsion.

15. The process according to claim 13, wherein a reductant is added to the emulsion.

16. The process according to claim 13, wherein an oxidant and a reductant is added to the emulsion.

17. A method for preparing a plurality of hollow, polymer clay nanocomposite particles, wherein the method comprises:

providing an aqueous emulsion of a multi-stage emulsion polymer comprising:
  (a) a core stage polymer comprising an aqueous polymer clay nanocomposite composition comprised of polymerized units of at least one ethylenically unsaturated monomer, optionally at least one unmodified clay, and at least one mociifying agent wherein the clay is lightly modified prior to the formation of the shell stage polymer; and
  (b) a shell stage polymer comprising polymerized units of at least one ethylenically unsaturated monomer and at least one lightly modified clay;

swelling the core stage polymer with at least one swelling agent and at least one ethylenically unsaturated monomer such that at least a portion of the core stage polymer contacts at least a portion of the shell stage polymer;

polymerizing the monomer to form the polymer clay nanocomposite particles which become hollow upon drying.

18. The process according to claim 17, wherein the glass transition temperature of said multi-stage emulsion polymer is in the range of from −80° C. to 140° C.

19. The process according to claim 17, wherein at least one ethylenically unsaturated monomer comprises an acid containing monomer.

* * * * *